United States Patent
Jin

(10) Patent No.: US 11,382,146 B2
(45) Date of Patent: *Jul. 5, 2022

(54) BEARER CONTROL METHOD AND SYSTEM

(71) Applicant: Huawei Technologies Co., Ltd., Shenzhen (CN)

(72) Inventor: Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 41 days.

This patent is subject to a terminal disclaimer.

(21) Appl. No.: 17/006,206

(22) Filed: Aug. 28, 2020

(65) Prior Publication Data

US 2020/0396777 A1 Dec. 17, 2020

Related U.S. Application Data

(63) Continuation of application No. 16/243,516, filed on Jan. 9, 2019, now Pat. No. 10,772,136, which is a
(Continued)

(51) Int. Cl.
*H04L 12/06* (2006.01)
*H04W 76/10* (2018.01)
(Continued)

(52) U.S. Cl.
CPC ........... *H04W 76/10* (2018.02); *H04M 15/66* (2013.01); *H04W 72/1236* (2013.01); *H04W 76/12* (2018.02); *H04W 76/27* (2018.02); *H04W 76/34* (2018.02); *H04W 28/24* (2013.01); *H04W 76/11* (2018.02); *H04W 76/22* (2018.02); *Y02D 30/70* (2020.08)

(58) Field of Classification Search
CPC . H04W 28/24; H04W 72/1236; H04W 76/10; H04W 76/11; H04W 76/12; H04W 76/22; H04W 76/27; H04W 76/34; H04M 15/66; Y02D 30/70
See application file for complete search history.

(56) References Cited

U.S. PATENT DOCUMENTS 8,345,612 B2 * 1/2013 Lim .................. H04W 8/26
370/329
8,498,208 B2 7/2013 Wang et al.
(Continued)

FOREIGN PATENT DOCUMENTS

CN 101374260 A 2/2009
CN 101854734 A 10/2010
(Continued)

*Primary Examiner* — Phuc H Tran
(74) *Attorney, Agent, or Firm* — Slater Matsil, LLP

(57) ABSTRACT

Embodiments provide a bearer control method and system. The bearer control method includes: establishing a PDN connection when a UE accesses a network; and identifying and transmitting a service data flow of the UE on an air interface bearer between the UE and an access network access node according to obtained QoS information, and transmitting the service data flow by using a transmission tunnel between the access network access node and a core network gateway, or directly sending the service data flow to a packet data network by using the access network access node.

20 Claims, 15 Drawing Sheets

Related U.S. Application Data continuation of application No. 15/298,463, filed on Oct. 20, 2016, now Pat. No. 10,201,024, which is a continuation of application No. PCT/CN2014/075819, filed on Apr. 21, 2014.

(51) Int. Cl.
| | |
|---|---|
| *H04W 76/27* | (2018.01) |
| *H04W 76/34* | (2018.01) |
| *H04W 76/12* | (2018.01) |
| *H04M 15/00* | (2006.01) |
| *H04W 72/12* | (2009.01) |
| *H04W 28/24* | (2009.01) |
| *H04W 76/11* | (2018.01) |
| *H04W 76/22* | (2018.01) |

(56) References Cited

U.S. PATENT DOCUMENTS

| | | |
|---|---|---|
| 2009/0190471 A1 | 7/2009 | Mahendran et al. |
| 2011/0170411 A1 | 7/2011 | Wang et al. |
| 2011/0310737 A1 | 12/2011 | Klingenbrunn et al. |
| 2013/0287012 A1 | 10/2013 | Pragada et al. |
| 2014/0018067 A1* | 1/2014 | Rajagopalan ........... H04W 8/20 455/432.1 |
| 2016/0112896 A1 | 4/2016 | Karampatsis et al. |
| 2017/0019816 A1* | 1/2017 | Yuan ..................... H04W 24/04 |

FOREIGN PATENT DOCUMENTS

| | | |
|---|---|---|
| CN | 101990247 A | 3/2011 |
| CN | 102238574 A | 11/2011 |
| CN | 102487530 A | 6/2012 |

* cited by examiner

BEARER CONTROL METHOD AND SYSTEM

CROSS-REFERENCE TO RELATED APPLICATIONS

This application is a continuation of U.S. application Ser. No. 16/243,516, filed on Jan. 9, 2019, which is a continuation of U.S. application Ser. No. 15/298,463, filed on Oct. 20, 2016, now U.S. Pat. No. 10,201,024, which is a continuation of International Application No. PCT/CN2014/075819, filed on Apr. 21, 2014. All of the afore-mentioned patent applications are hereby incorporated by reference in their entireties.

TECHNICAL FIELD

The present invention relates to the field of communications technologies, and in particular, to a bearer control method and system.

BACKGROUND

In a cellular network, data transmission from a terminal device, such as user equipment (UE), to a packet data gateway (PGW) is implemented by using an end-to-end bearer. Long Term Evolution (LTE) is used as an example. A bearer from the UE to the PGW determines a data transmission connection between the UE and the PGW, and the bearer from the UE to the PGW is formed by connecting multiple sections of bearers mapped onto different network nodes. Each section of bearer is identified by quality of service (QoS). Service data flows may be filtered to different bearers by using a data flow filter, so that service data flows having a same QoS requirement may be aggregated on a same bearer for transmission.

A process in which a network establishes, modifies, or deletes an end-to-end bearer according to the terminal device and the QoS of the service data flow is a part of session management. In addition to the session management, mobility management on the terminal device is also an important part in the cellular network, and the mobility management mainly includes updating of a location area in which the terminal device is located and paging of the terminal device.

After the LTE is introduced, because mobility management is separately performed on the LTE and Global System for Mobile Communications (GSM)/Wideband Code Division Multiple Access (WCDMA) by using different core network mobility management entities, when the terminal device moves between the LTE and the GSM/WCDMA, location areas of different systems may need to be frequently updated.

In conclusion, in the prior art, a core network gateway establishes an end-to-end bearer according to the QoS requirement, and maps the service data flow of the terminal device onto the bearer. The core network gateway does not know a resource status of an access network. When the QoS requirement of the service data flow changes, the end-to-end bearer needs to be modified. The end-to-end bearer is bound to an access technology, and cannot support a mode in which service data flows are transmitted by using multiple access technologies and resources of the access technologies are dynamically used according to a resource status. The core network gateway needs to send a downlink data notification to the mobility management entity, so as to trigger paging, and the mobility management entity pages an access network device in a location area registered by the terminal device.

SUMMARY

In view of this, a problem that needs to be resolved is how to implement flexible control on a bearer and implement transmission of a service data flow of a terminal device by using multiple access technologies.

To resolve the foregoing technical problem, according to an embodiment, according to a first aspect, a bearer control method is provided, applied to a network architecture supporting multiple access technologies. The method includes establishing a packet data network (PDN) connection when a terminal device UE accesses a network. The method also includes identifying and transmitting a service data flow of the UE on an air interface bearer between the UE and an access network access node according to obtained quality of service (QoS) information, and transmitting the service data flow by using a transmission tunnel between the access network access node and a core network gateway, or directly sending the service data flow to a packet data network by using the access network access node.

With reference to the first aspect, in a first possible implementation manner of the first aspect, the establishing a packet data network (PDN) connection when a terminal device UE accesses a network includes: adding a PDN connection policy session to an access network control session between the access network access node and a PCRF; or adding the PDN connection policy session between the access network access node and a mobility management entity MME and/or between the MME and the PCRF.

With reference to the first aspect, in a second possible implementation manner of the first aspect, before the identifying and transmitting a service data flow of the UE on an air interface bearer between the UE and an access network access node according to obtained QoS information, the method includes: receiving, by the access network access node, the QoS information sent by the PCRF, or receiving, by the access network access node by using the MME, the QoS information sent by the PCRF; and performing, by the access network access node, radio resource control RRC connection reconfiguration between the UE and the access network node according to the QoS information, and allocating an air interface resource to the air interface bearer.

With reference to the second possible implementation manner of the first aspect, in a third possible implementation manner of the first aspect, the performing, by the access network access node, radio resource control protocol RRC connection reconfiguration includes: sending, by the access network access node, an RRC connection reconfiguration message to the UE, and allocating the air interface resource to the air interface bearer; and receiving, by the access network access node, an RRC connection reconfiguration success response from the UE. The RRC connection reconfiguration message includes a mapping relationship between the service data flow of the UE and the air interface bearer and an identifier of the air interface resource, and the identifier is used to indicate the air interface resource used by the UE to transmit, on the air interface bearer, the service data flow.

With reference to the first aspect, in a fourth possible implementation manner of the first aspect, the core network gateway includes a serving gateway and/or a packet data gateway, and before the transmitting the service data flow by using a transmission tunnel between the access network access node and a core network gateway, the method includes: receiving, by the MME, a PDN connection establishment request sent by the UE, where the PDN connection establishment request carries a PDN identifier access point name APN; selecting, by the MME, the core network gateway according to the APN and subscription information of the UE; sending, by the MME, a session establishment request to the core network gateway, where the session establishment request carries first channel information allocated by the serving gateway to the PDN connection, the first channel information includes an IP address and a port number that are of a first channel and that are allocated by the access network access node to the UE, and the first channel information is used to establish the first channel between the serving gateway and the packet data gateway; and returning, by the core network gateway, a session establishment response to the MME, where the session establishment response carries second channel information allocated by the packet data gateway to the PDN connection, the second channel information includes an IP address and a port number that are of a second channel and that are allocated by the core network gateway to the UE, and the second channel information is used to establish the second channel between the packet data gateway and the serving gateway. The first channel and the second channel form the transmission tunnel, which is used to transmit the service data flow between the access network access node and the core network gateway.

With reference to any one of the first aspect, or the first to the fourth possible implementation manners of the first aspect, in a fifth possible implementation manner of the first aspect, when the access network access node detects the service data flow of the UE, the method further includes: sending, by the access network access node, a service detection report to the PCRF, and receiving the QoS information returned by the PCRF; or sending, by the access network access node by using the MME, a service detection report to the PCRF, and receiving, by using the MME, the QoS information returned by the PCRF; and allocating, by the access network access node, the service data flow of the UE to the air interface bearer according to the QoS information.

With reference to any one of the first aspect, or the first to the fifth possible implementation manners of the first aspect, in a sixth possible implementation manner of the first aspect, in a case in which the access network access node detects that the UE does not have a service data flow in a first preset period of time, the method further includes: releasing first connection information between the access network access node and the UE, storing a context of the UE in the access network access node, and buffering downlink data of the UE in the access network access node. The first connection information is at least one of: the mapping relationship between the service data flow of the UE and the air interface bearer, or the air interface resource allocated by the access network access node to the UE.

With reference to any one of the first aspect, or the first to the fifth possible implementation manners of the first aspect, in a seventh possible implementation manner of the first aspect, in a case in which the access network access node detects that the UE does not have a service data flow in the first preset period of time, the method further includes: releasing an RRC connection and second connection information that is between the access network access node and the serving gateway, storing the context of the UE in the MME, and buffering the downlink data of the UE in the serving gateway. The second connection information is at least one of: intermediate data generated when the service data flow is transmitted between the access network access node and the serving gateway, an occupied memory, an occupied port, or an occupied computing resource. The context of the UE includes at least one of: the service data flow of the UE, the QoS information, the air interface resource occupied by the UE, or a location area of the UE.

With reference to the sixth possible implementation manner of the first aspect, in an eighth possible implementation manner of the first aspect, when the UE has a new service data flow, the method further includes: receiving, by the access network access node, a recovery request sent by the UE; allocating, by the access network access node, the new service data flow to the air interface bearer according to the stored context of the UE and the QoS information; and allocating, by the access network access node, the air interface resource to the air interface bearer, so that the new service data flow is transmitted on the air interface bearer.

With reference to any one of the first aspect, or the first to the eighth possible implementation manners of the first aspect, in a ninth possible implementation manner of the first aspect, the method further includes: adding or modifying, by the access network access node, a dedicated air interface bearer according to the QoS information, where the dedicated air interface bearer is established according to at least one of a scheduling priority, a delay, a packet loss rate, or a bandwidth requirement in the QoS information, and the dedicated air interface bearer carries matching information of the service data flow and the dedicated air interface bearer.

With reference to the first aspect, in a tenth possible implementation manner of the first aspect, a location area of the UE is managed by an MME, a context of the UE is stored in the MME, and when a location of the UE changes, the method further includes: sending, by the MME, a context release command to the access network access node, so as to instruct the access network access node to release the context of the UE and transfer the context of the UE to the MME. The context of the UE includes at least one of: the service data flow of the UE, the QoS information, a mapping relationship between the service data flow of the UE and the air interface bearer, an air interface resource occupied by the UE, or a location area of the UE. The method also includes retrieving, by a new MME, the context of the UE from the MME; and updating, by the new MME according to a location change of the UE, a location area registered by the UE.

With reference to the first aspect, in an eleventh possible implementation manner of the first aspect, a location area of the UE is managed by the access network access node, the MME manages a node identifier when the UE moves between different access network access nodes, and when a location of the UE changes, the method further includes: sending, by the UE, an identifier of the MME to a new access network access node; sending, by the new access network access node to a new MME, an identifier of the new access network access node, a temporary identifier allocated by the MME to the UE, and the identifier of the MME; determining, by the new MME, whether the UE is registered; if yes, searching, by the new MME, for an identifier of the access network access node by using a context of the UE, and instructing, according to the identifier of the access network access node, the access network access node to delete a location area registered by the UE; or if no, finding, by the new MME, the MME according to the received identifier of the MME, searching the MME for a registered context of the UE, searching for an identifier of the access network access node by using the context of the UE, and instructing, according to the identifier of the access network access node, the access network access node to delete a location area registered by the UE; and updating, by the new access network access node according to a location change of the UE, the location area registered by the UE.

With reference to the eleventh possible implementation manner of the first aspect, in a twelfth possible implementation manner of the first aspect, the location area of the UE is managed by the access network access node, the MME manages a node identifier when the UE moves between different access network access nodes, and when the location of the UE changes, the method further includes: sending, by the UE, the identifier of the MME to the new access network access node; determining, by the new access network access node according to the identifier of the MME, whether the MME is the new MME with which the new access network access node is registered; if yes, sending, by the new access network access node to a new MME, the identifier of the new access network access node and the temporary identifier allocated by the MME to the UE, searching, by the new MME, for an identifier of the access network access node by using the context of the UE, and instructing, according to the identifier of the access network access node, the access network access node to delete the location area registered by the UE; or if no, sending, by the new access network access node to the new MME, the identifier of the new access network access node, the temporary identifier allocated by the MME to the UE, and the identifier of the MME, finding, by the new MME, the MME according to the received identifier of the MME, searching the MME for a registered context of the UE, searching for an identifier of the access network access node by using the context of the UE, and instructing, according to the identifier of the access network access node, the access network access node to delete the location area registered by the UE; and updating, by the new access network access node according to the location change of the UE, the location area registered by the UE.

With reference to any one of the first aspect, or the first to the twelfth possible implementation manners of the first aspect, in a thirteenth possible implementation manner of the first aspect, when the UE has a new service data flow, the method further includes: receiving, by the access network access node, the downlink data of the UE, or receiving downlink data sent by the serving gateway; and initiating paging of the UE in the location area registered by the UE.

With reference to the thirteenth possible implementation manner of the first aspect, in a fourteenth possible implementation manner of the first aspect, the method further includes: receiving, by the MME, a downlink data notification of the UE from the serving gateway, and sending a paging message to the access network access node, so as to instruct the access network access node to initiate paging of the UE; or receiving, by the access network access node, the paging message, and initiating paging of the UE in the location area registered by the UE.

According to a second aspect, embodiments provide a bearer control system, applied to a network architecture supporting multiple access technologies. The system includes an access network access node; a mobility management entity MME; and a core network gateway. The system also includes an establishment module, configured to establish a packet data network (PDN) connection when a terminal device UE accesses a network. The system also includes a transmission module, configured to: identify and transmit a service data flow of the UE on an air interface bearer between the UE and the access network access node according to obtained quality of service (QoS) information, and transmit the service data flow by using a transmission tunnel between the access network access node and the core network gateway, or directly send the service data flow to a packet data network by using the access network access node.

With reference to the second aspect, in a first possible implementation manner of the second aspect, the establishment module includes: an adding unit, configured to: add a PDN connection policy session to an access network control session between the access network access node and a PCRF; or add the PDN connection policy session between the access network access node and the MME and/or between the MME and the PCRF.

With reference to the second aspect, in a second possible implementation manner of the second aspect, the access network access node includes: a receiving unit, configured to: receive the QoS information sent by the PCRF, or receive, by using the MME, the QoS information sent by the PCRF; and a reconfiguration unit, connected to the receiving unit, configured to: perform radio resource control RRC connection reconfiguration between the UE and the access network node according to the QoS information, and allocate an air interface resource to the air interface bearer.

With reference to the second possible implementation manner of the second aspect, in a third possible implementation manner of the second aspect, the access network access node further includes: a sending unit, configured to: send an RRC connection reconfiguration message to the UE, and allocate the air interface resource to the air interface bearer; and the receiving unit is further configured to receive an RRC connection reconfiguration success response from the UE; where the RRC connection reconfiguration message includes a mapping relationship between the service data flow of the UE and the air interface bearer and an identifier of the air interface resource, and the identifier is used to indicate the air interface resource used by the UE to transmit, on the air interface bearer, the service data flow.

With reference to the second aspect, in a fourth possible implementation manner of the second aspect, the core network gateway includes a serving gateway and/or a packet data gateway, and the MME includes: a receiving unit, configured to receive a PDN connection establishment request sent by the UE, where the PDN connection establishment request carries a PDN identifier access point name APN; a selection unit, connected to the receiving unit, configured to select the core network gateway according to the APN and subscription information of the UE; a sending unit, connected to the selection unit, configured to send a session establishment request to the core network gateway, where the session establishment request carries first channel information allocated by the serving gateway to the PDN connection, the first channel information includes an IP address and a port number that are of a first channel and that are allocated by the access network access node to the UE, and the first channel information is used to establish the first channel between the serving gateway and the packet data gateway. The receiving unit is further configured to receive a session establishment response from the core network gateway, where the session establishment response carries second channel information allocated by the packet data gateway to the PDN connection, the second channel information includes an IP address and a port number that are of a second channel and that are allocated by the core network gateway to the UE, and the second channel information is used to establish the second channel between the packet data gateway and the serving gateway. The first channel and the second channel form the transmission tunnel, which is used to transmit the service data flow between the access network access node and the core network gateway.

With reference to any one of the second aspect, or the first to the fourth possible implementation manners of the second aspect, in a fifth possible implementation manner of the second aspect, when the access network access node detects the service data flow of the UE, the sending unit of the access network access node is further configured to: send a service detection report to the PCRF, or send the service detection report to the PCRF by using the MME; and the receiving unit of the access network access node is further configured to: receive the QoS information returned by the PCRF, or receive the QoS information returned by the PCRF by using the MME; and the access network access node further includes: an allocation unit, configured to allocate the service data flow of the UE to the air interface bearer according to the QoS information.

With reference to any one of the second aspect, or the first to the fifth possible implementation manners of the second aspect, in a sixth possible implementation manner of the second aspect, the access network access node further includes a releasing unit, and in a case in which the access network access node detects that the UE does not have a service data flow in a first preset period of time, the releasing unit is configured to: release first connection information between the access network access node and the UE, store a context of the UE in the access network access node, and buffer downlink data of the UE in the access network access node, where the first connection information is at least one of: the mapping relationship between the service data flow of the UE and the air interface bearer, or the air interface resource allocated by the access network access node to the UE.

With reference to any one of the second aspect, or the first to the fifth possible implementation manners of the second aspect, in a seventh possible implementation manner of the second aspect, in a case in which the access network access node detects that the UE does not have a service data flow in the first preset period of time, the releasing unit is further configured to: release an RRC connection and second connection information that is between the access network access node and the serving gateway, store the context of the UE in the MME, and buffer the downlink data of the UE in the serving gateway, where the second connection information is at least one of: intermediate data generated when the service data flow is transmitted between the access network access node and the serving gateway, an occupied memory, an occupied port, or an occupied computing resource; and the context of the UE includes at least one of: the service data flow of the UE, the QoS information, the air interface resource occupied by the UE, or a location area of the UE.

With reference to the sixth possible implementation manner of the second aspect, in an eighth possible implementation manner of the second aspect, when the UE has a new service data flow, the receiving unit of the access network access node is further configured to receive a recovery request sent by the UE; the allocation unit is further configured to allocate the new service data flow to the air interface bearer according to the stored context of the UE and the QoS information; and the allocation unit is further configured to allocate the air interface resource to the air interface bearer, so that the new service data flow is transmitted on the air interface bearer.

With reference to any one of the second aspect, or the first to the eighth possible implementation manners of the second aspect, in a ninth possible implementation manner of the second aspect, the access network access node further includes: a modification unit, configured to add or modify a dedicated air interface bearer according to the QoS information, where the dedicated air interface bearer is established according to at least one of a scheduling priority, a delay, a packet loss rate, or a bandwidth requirement in the QoS information, and the dedicated air interface bearer carries matching information of the service data flow and the dedicated air interface bearer.

With reference to the second aspect, in a tenth possible implementation manner of the second aspect, a location area of the UE is managed by the MME, a context of the UE is stored in the MME, and when a location of the UE changes, the sending unit of the MME is further configured to send a context release command to the access network access node, so as to instruct the access network access node to release the context of the UE and transfer the context of the UE to the MME, where the context of the UE includes at least one of: the service data flow of the UE, the QoS information, a mapping relationship between the service data flow of the UE and the air interface bearer, an air interface resource occupied by the UE, or a location area of the UE; and a new MME includes: a retrieving unit, configured to retrieve the context of the UE from the MME; and an updating unit, connected to the retrieving unit, configured to update, according to a location change of the UE, a location area registered by the UE.

With reference to the second aspect, in an eleventh possible implementation manner of the second aspect, a location area of the UE is managed by the access network access node, the MME manages a node identifier when the UE moves between different access network access nodes, and when a location of the UE changes, a new access network access node includes: a receiving unit, configured to receive an identifier of the MME from the UE; and a sending unit, connected to the receiving unit, configured to send, to a new MME, an identifier of the access network access node, a temporary identifier allocated by the MME to the UE, and the identifier of the MME; where the new MME further includes: a determining unit, configured to determine whether the UE is registered; and a searching unit, in a case in which it is determined that the UE is registered, configured to: search for an identifier of the access network access node by using a context of the UE, and instruct, according to the identifier of the access network access node, the access network access node to delete a location area registered by the UE; or in a case in which it is determined that the UE is not registered, configured to: find the MME according to the received identifier of the MME, search the MME for a registered context of the UE, search for an identifier of the access network access node by using the context of the UE, and instruct, according to the identifier of the access network access node, the access network access node to delete the location area registered by the UE; and the new access network access node further includes: an updating unit, configured to update, according to a location change of the UE, the location area registered by the UE.

With reference to the eleventh possible implementation manner of the second aspect, in a twelfth possible implementation manner of the second aspect, the location area of the UE is managed by the access network access node, the MME manages the node identifier when the UE moves between different access network access nodes, and when the location of the UE changes, the new access network access node further includes: a determining unit, configured to determine, according to the identifier of the MME, whether the MME is the new MME with which the new access network access node is registered, where the sending unit of the new access network access node is further configured to: in a case in which a determining result is yes, send, to the new MME, the identifier of the new access network access node and the temporary identifier allocated by the MME to the UE; or the sending unit of the new access network access node is further configured to: in a case in which a determining result is no, send, to the new MME, the identifier of the new access network access node, the temporary identifier allocated by the MME to the UE, and the identifier of the MME.

With reference to any one of the second aspect, or the first to the twelfth possible implementation manners of the second aspect, in a thirteenth possible implementation manner of the second aspect, when the UE has a new service data flow, the receiving unit of the access network access node is further configured to: receive the downlink data of the UE, or receive downlink data sent by the serving gateway; and initiate paging of the UE in the location area registered by the UE.

With reference to the thirteenth possible implementation manner of the second aspect, in a fourteenth possible implementation manner of the second aspect, the receiving unit of the MME is further configured to receive a downlink data notification of the UE from the serving gateway, and the sending unit of the MME is further configured to send a paging message to the access network access node, so as to instruct the access network access node to initiate paging of the UE; or the receiving unit of the access network access node is further configured to: receive the paging message, and initiate paging of the UE in the location area registered by the UE.

In the embodiments, a function of an MME is simplified by performing hierarchical management on a bearer between UE and a network; an access network access node controls transmission of a service data flow on the air interface bearer according to QoS information. This enhances management on an air interface resource status by the access network access node, further, improves network resource management efficiency and a network capacity, reduces power consumption, and provides a basis for further evolution of a mobile network.

Exemplary embodiments are described in detail below according to the following reference accompanying drawings, and another characteristic and another aspect of the present invention become clear.

BRIEF DESCRIPTION OF THE DRAWINGS

Accompanying drawings included in the specification and constructing a part of the specification jointly show the exemplary embodiments, characteristics and aspects of the present invention, and are intended to explain the principles of the present invention.

DETAILED DESCRIPTION OF ILLUSTRATIVE EMBODIMENTS

The following will describe various exemplary embodiments, features and aspects of the present invention in detail with reference to the accompanying drawings. Like accompanying symbols in the accompanying drawings represent elements with like or similar functions. Although various aspects of the embodiments are illustrated in the accompanying drawing, the accompanying drawings are not necessarily drawn in proportion unless otherwise specified.

The specific term "exemplary" herein means "used as an example, embodiment or illustrative". Any embodiment described as "exemplary" is not necessarily explained as being superior or better than other embodiments.

In addition, for better illustration of the present invention, various specific details are given in the following specific implementation manner. A person of ordinary skill in the art should understand that the present invention may also be implemented without the specific details. In some other embodiments, methods, means, components, and circuits well known by a person skilled in the art are not described in detail, so that a main purpose of the present invention is highlighted.

Embodiment 1

Figure 1:
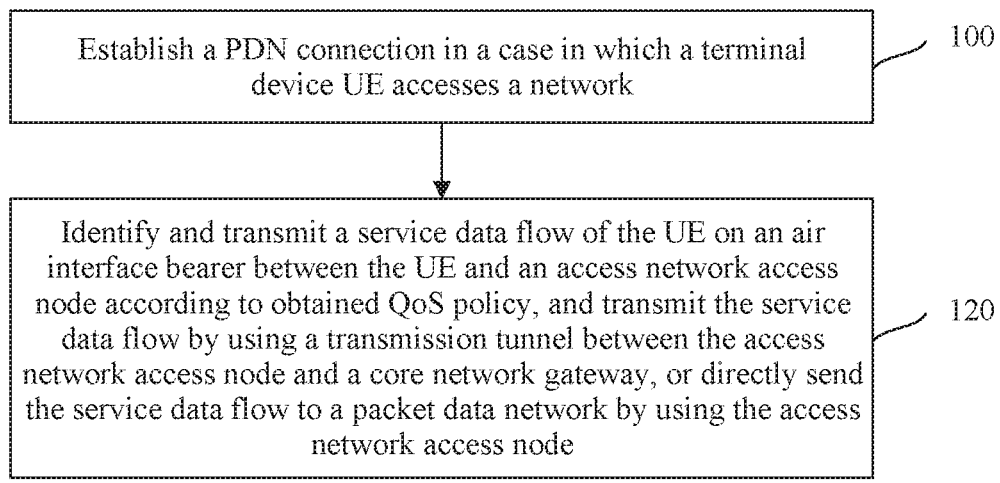
FIG. 1 is a flowchart of a bearer control method according to Embodiment 1.

FIG. 1 is a flowchart of a bearer control method according to Embodiment 1. As shown in FIG. 1, the bearer control method may mainly include the following steps.

Step 100: Establish a packet data network (PDN) connection when a terminal device UE accesses a network.

Specifically, in a process of accessing the network by the UE, network access registration first needs to be performed, and authentication is performed on the UE by obtaining subscription information between the UE and the network. The subscription information may be saved in a home subscriber server (HSS). The foregoing network access registration process of the UE is an attach procedure. After the attach procedure, the UE already accesses the network. However, to perform data transmission between networks, that is, to complete a corresponding subscriber service, a PDN policy session further needs to be added, so as to establish a PDN connection between the UE and the network. The HSS is a database saving user subscription information, and the subscription information may include: a user category, a service use right, a quality-of-service class, a charging mode, and the like that are negotiated by the user with an operator.

Step 120: Identify and transmit a service data flow of the UE on an air interface bearer between the UE and an access network access node according to obtained quality of service (QoS) information, and transmit the service data flow by using a transmission tunnel between the access network access node and a core network gateway, or directly send the service data flow to a packet data network by using the access network access node.

Specifically, after the PDN connection is established, the UE may receive the QoS information from a policy and charging rule function (PCRF) decision point by using the PDN connection. The service data flow of the UE may be identified according to a requirement of the QoS information. Further, a data path of a granularity of the foregoing PDN connection may include an air interface bearer part and a transmission tunnel part. The air interface bearer is a transmission path between the UE and the access network access node (for example, an eNodeB). The service data flow of the UE may be identified according to the requirement of the received QoS information, and service data flows that do not meet the requirement of the QoS information are separately matched with different air interface bearers. The access network access node may separately allocate an air interface resource to different air interface bearers, so as to transmit the service data flow of the UE. The transmission tunnel part is the transmission tunnel between the access network access node and the PCRF, may be used to transmit the service data flow between the access network access node and the PCRF, and does not require that the service data flow is identified according to the requirement of the QoS information. Alternatively, in a case in which the access network access node already accesses the network and has a network interface, the access network access node may directly send, to the packet data network, the service data flow that is received from the UE by using the air interface bearer.

In a possible implementation manner, the data path of the granularity of the PDN connection established between the access network access node and the core network gateway bears all uplink data and downlink data of the PDN connection of the UE. In a case in which the UE changes into an idle state, that is, in a case in which no service data flow needs to be transmitted, context information of the UE saved in each network node may be deleted and released on the data path, so as to improve network resource utilization. In addition, the data path may be reserved. When the UE initiates a location update on another access network access node, the data path between the original access network access node and the core network gateway may be deleted. When the UE initiates a service request, that is, in a case in which a service data flow needs to be transmitted, the data path of the granularity of the PDN connection that is of the UE and that is between the access network access node in which the UE initiates the service request and the core network gateway may be recovered.

In a possible implementation manner, in the foregoing network architecture, the access network access node may be an evolved NodeB (eNB) in the LTE, a base station (NodeB) and a radio network controller (RNC) in the Universal Mobile Telecommunications System (UMTS), a base transceiver station (BTS) and a base station controller (BSC) in the Global System for Mobile Communications (GSM), and a single radio network controller (SRC), where the SRC is an access network that integrates a multi-mode radio network controller or coordinator, and the access network may include the LTE, the UMTS, and a network of access technologies such as the Code Division Multiple Access (CDMA) 2000 and the GSM, where the LTE belongs to the 4th Generation Mobile Communication (4G) technology, the UMTS and the CDMA2000 belong to the 3rd Generation Mobile Communication (3G) technology, and the GSM belongs to the 2nd Generation Mobile Communication (2G) technology. The core network gateway may be a gateway GPRS support node (GGSN) of a general packet radio service (GPRS) core network, and a serving gateway (SGW) and a PGW of a 4G core network (EPC). A mobility management entity may be a mobility management entity (MME) of the LTE, a serving GPRS support node (SGSN) of the UMTS and the GSM, and a core network controller (CC) unrelated to the access technology. When the SGSN has a user plane, the SGSN may be both the mobility management entity and the core network gateway.

According to the bearer control method in this embodiment, a function of an MME is simplified by performing hierarchical management on a bearer between UE and a network; an access network access node controls transmission of a service data flow on the air interface bearer according to QoS information. This enhances management on an air interface resource status by the access network access node, further, improves network resource management efficiency and a network capacity, reduces power consumption, and provides a basis for further evolution of a mobile network.

Embodiment 2

Figure 2:
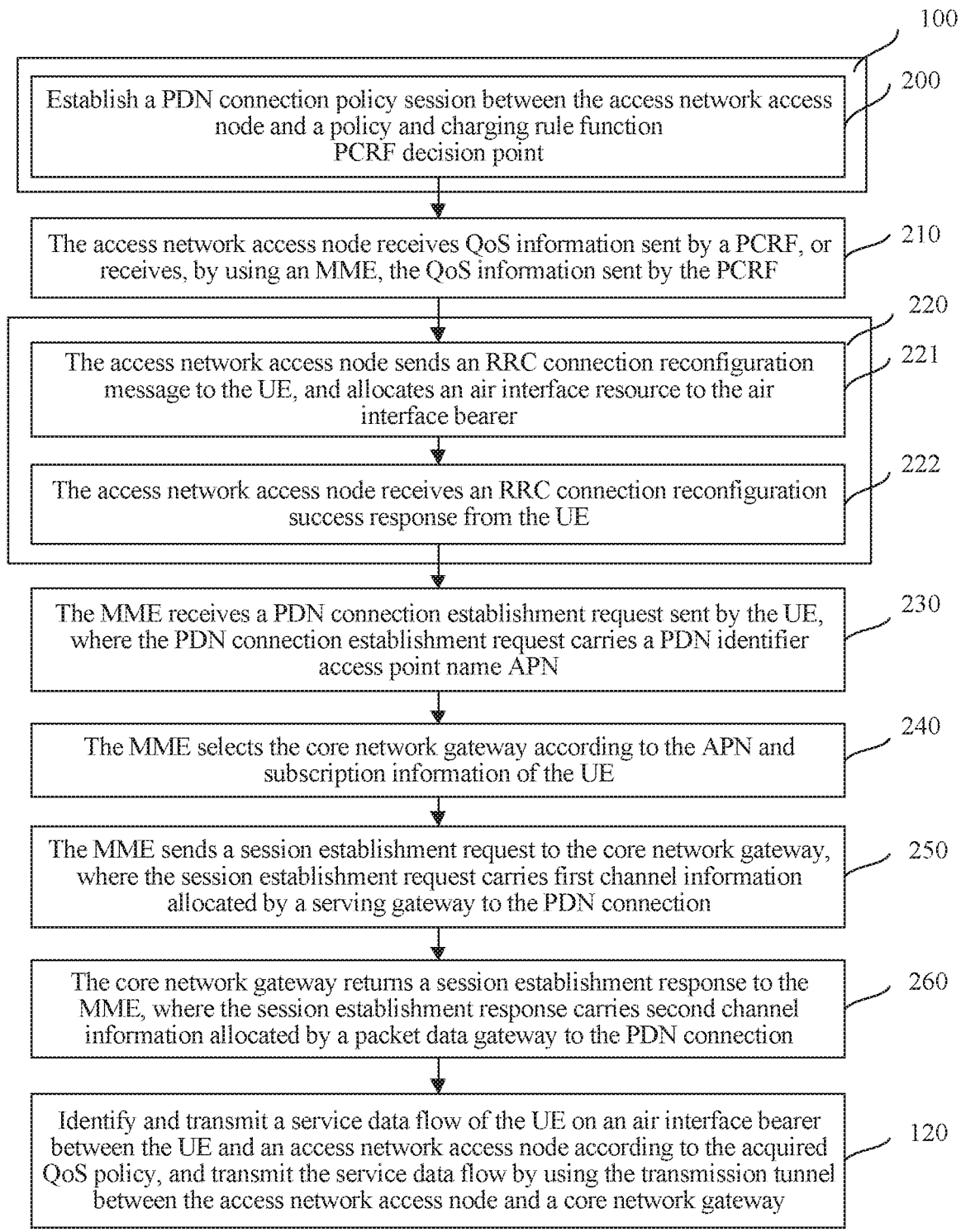
FIG. 2 is a flowchart of a bearer control method according to Embodiment 2.

FIG. 2 is a flowchart of a bearer control method according to Embodiment. Steps that have a same reference sign in FIG. 2 and FIG. 1 have a same function. For brevity, detailed descriptions about these steps are omitted.

As shown in FIG. 2, a main difference between the bearer control method shown in FIG. 2 and the bearer control method shown in FIG. 1 is that step 100 may specifically include the following steps.

Step 200: Establish a PDN connection policy session between an access network access node and a policy and charging rule function PCRF decision point.

Further, step 200 may be implemented in either of the following two possible manners:

Manner 1: A PDN connection policy session is added to an access network control session between the access network access node and the PCRF; or Manner 2: The PDN connection policy session is added between the access network access node and a mobility management entity MME and/or between the MME and the PCRF.

Specifically, on one hand, after UE completes an attach procedure, each node in a network, for example, the access network access node or the MME, may save identification information of the UE. On the other hand, in a process of establishing a PDN connection, each node in the network, for example, the access network access node or the MME, may further save identification information of a PDN. The access network access node or the MME may find a corresponding PCRF in the network by using the saved identification information of the UE and the saved identification information of the PDN, and initiate establishing of the PDN connection policy session. If all PDN connections of the UE are served by one PCRF, Manner 1 may be used, and the PDN connection policy session is added to the access network control session between the access network access node and the PCRF. If all PDN connections of the UE are respectively served by multiple PCRFs, Manner 2 may be used, the PDN connection policy session is added between the access network access node and the MME, and the MME and the PCRF establish the PDN connection policy session between the MME and the PCRF.

In a possible implementation manner, before step 120, the bearer control method may further include:

Step 210: The access network access node receives QoS information sent by the PCRF, or the access network access node receives, by using the MME, the QoS information sent by the PCRF.

Step 220: The access network access node performs radio resource control (RRC) connection reconfiguration between the UE and the access network node according to the QoS information, and allocates an air interface resource to an air interface bearer.

Specifically, the access network access node may directly receive the QoS information from the PCRF by using the foregoing transmission path, or may receive the QoS information from the PCRF by using the MME, so that the access network access node may subsequently identify a service data flow of the UE according to the QoS information, and complete the radio resource control (RRC) connection reconfiguration.

Further, after receiving the QoS information, the access network access node may identify the service data flow of the UE according to a requirement of the QoS information, establish a mapping relationship between different service data flows that meet different requirements of the QoS information and different air interface bearers, and allocate, to different air interface bearers, the air interface resource, that is, the air interface resource used when different service data flows are transmitted on different air interface bearers.

Step 220 may further include the following steps.

Step 221: The access network access node sends an RRC connection reconfiguration message to the UE, and allocates the air interface resource to the air interface bearer.

Step 222: The access network access node receives an RRC connection reconfiguration success response from the UE.

The RRC connection reconfiguration message includes the mapping relationship between the service data flow of the UE and the air interface bearer and an identifier of the air interface resource, and the identifier of the air interface resource is used to indicate the air interface resource used by the UE to transmit, on the air interface bearer, the service data flow. The access network access node may receive the RRC connection reconfiguration success response from the UE, so that the RRC connection reconfiguration process is completed.

In a possible implementation manner, the access network access node may further obtain the QoS information (such as bandwidth, a priority, a delay, and a packet loss rate) of the service data flow by using uplink and downlink data flows that are of the UE and that are identified by the access network access node. Further, if the UE transmits the service data flow by using the foregoing data path, a node in a network (for example, the MME) may save a context of the UE, including the mapping relationship that is between the service data flow and the QoS information and that is in the context. In this case, the access network access node may obtain, from the MME, the mapping relationship that is between the service data flow and the QoS information and that is in the context, allocate uplink and downlink resources (especially air interface radio resources) to the UE, map the uplink and downlink resources to the air interface bearer, and send, by using the RRC connection reconfiguration message to the UE, the mapping relationship between the service data flow and the air interface bearer and the air interface resource that is used when the UE transmits, on the air interface bearer, the service data flow.

In a possible implementation manner, a core network gateway may include a serving gateway SGW and/or a packet data gateway PGW. Before step 120, the bearer control method may further include the following steps.

Step 230: The MME receives a PDN connection establishment request sent by the UE, where the PDN connection establishment request carries a PDN identifier access point name APN.

Specifically, after establishing an air interface connection to the access network access node by using an access technology (for example, LTE, WCDMA, and GSM), the UE may send, by using the air interface connection, the PDN connection establishment request to the MME, where the PDN connection establishment request may carry the PDN identifier access point name (APN for short), and the APN may be used to indicate a PDN network used by the UE. Optionally, if the UE does not complete the attach procedure, the PDN connection establishment request may also be an attach request, and the MME may perform authentication on the UE according to subscription information that is of the UE and that is saved in the HSS, so as to ensure security of a network. For a specific example of subscription information, refer to the related description of the bearer control method in Embodiment 1 of the present invention.

Step 240: The MME selects the core network gateway according to the APN and subscription information of the UE.

Step 250: The MME sends a session establishment request to the core network gateway, where the session establishment request carries first channel information allocated by the serving gateway to the PDN connection, the first channel information includes an IP address and a port number that are of a first channel and that are allocated by the access network access node to the UE, and the first channel information is used to establish the first channel between the serving gateway and the packet data gateway.

Step 260: The core network gateway returns a session establishment response to the MME, where the session establishment response carries second channel information allocated by the packet data gateway to the PDN connection, the second channel information includes an IP address and a port number that are of a second channel and that are allocated by the core network gateway to the UE, and the second channel information is used to establish the second channel between the packet data gateway and the serving gateway. The first channel and the second channel form the transmission tunnel, which is used to transmit the service data flow between the access network access node and the core network gateway.

Specifically, the MME may select the core network gateway for the UE according to the received APN and the subscription information of the UE, where the core network gateway may include the packet data gateway and the serving gateway; and send the session establishment request to the serving gateway, and then send the session establishment request to the packet data gateway by using the serving gateway, where: the session establishment request may carry the first channel information allocated by the serving gateway to the PDN connection that needs to be established; and the first channel information may include the IP address, the port number, and the like that are of the first channel and that are allocated by the access network access node to the UE, so as to establish the first channel between the serving gateway and the packet data gateway in the PDN connection. In this way, the first channel between the packet data gateway and the serving gateway is already established. In a possible implementation manner, in this case, the packet data gateway may send, to the serving gateway, the downlink data that is transmitted by the UE on the PDN connection. The downlink data may be temporarily buffered in the serving gateway. The packet data gateway sends the session establishment response to the serving gateway, where: the session establishment response may carry the second channel information allocated by the packet data gateway to the PDN connection; and the second channel information may include the IP address, the port number, and the like that are of the second channel and that are allocated by the core network gateway to the UE, so as to establish the second channel between the packet data gateway and the serving gateway in the PDN connection. After receiving the session establishment response, the serving gateway may send the session establishment response to the MME, where the session establishment response may carry the first channel information allocated by the serving gateway to the PDN connection. After receiving the session establishment response, the MME may send a PDN connection channel establishment request and downlink channel information to the access network access node, where the downlink channel information may include the IP address, the port number, and the like that are allocated to the UE, so as to establish a downlink channel between the MME and the access network access node. The access network access node feeds back the PDN connection channel establishment response to the MME, where: the PDN connection channel establishment response may carry uplink channel information allocated by the access network access node to the PDN connection; and the uplink channel information may include the IP address, the port number, and the like that are allocated to the UE, so as to establish an uplink channel between the MME and the access network access node. The UE feeds back to the MME that the PDN connection has been established. In this case, the UE may send uplink data to the packet data gateway, and in this case, the downlink data that might be buffered in the serving gateway may also be sent to the UE.

It should be noted that in a process of establishing the PDN connection, an initial air interface bearer may be established between the UE and the access network access node, where the initial air interface bearer may include a dedicated air interface bearer. After receiving the QoS information, the access network access node may add or modify the dedicated air interface bearer according to a requirement of the QoS information, where the dedicated air interface bearer is established according to at least one of a scheduling priority, a delay, a packet loss rate, or a bandwidth requirement in the QoS information, and the dedicated air interface bearer carries matching information of the service data flow and the dedicated air interface bearer.

According to the bearer control method in this embodiment, a function of an MME is simplified by performing hierarchical management on a bearer between UE and a network; an access network access node controls transmission of a service data flow on the air interface bearer according to QoS information. This enhances management on an air interface resource status by the access network access node, further, improves network resource management efficiency and a network capacity, reduces power consumption, and provides a basis for further evolution of a mobile network.

Embodiment 3

Figure 3:
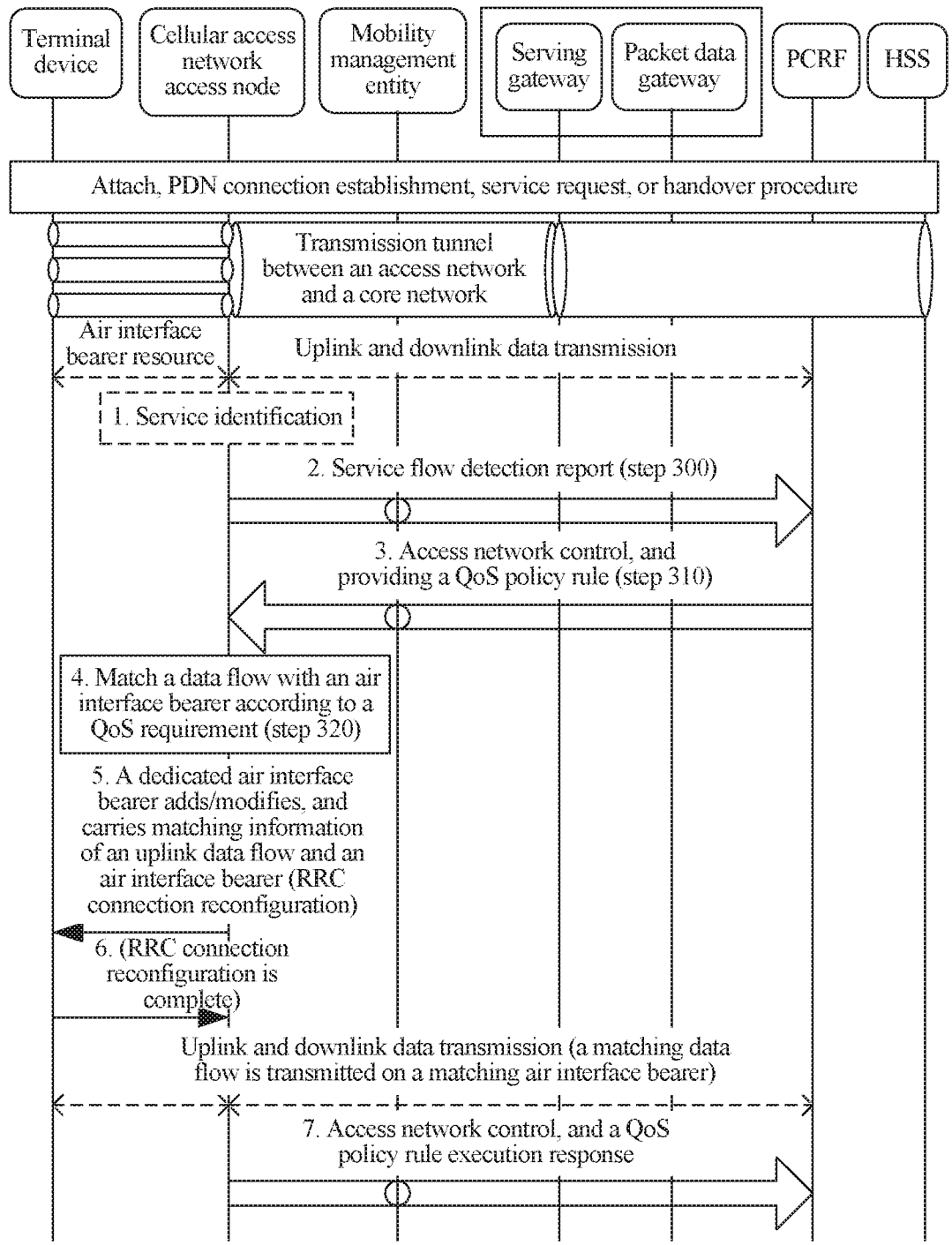
FIG. 3 is a diagram of a scenario of a bearer control method according to Embodiment 3.

FIG. 3 is a diagram of a scenario of a bearer control method according to Embodiment 3. As shown in FIG. 3, after a PDN connection is established, a service data flow of UE may change. For example, the service data flow of the UE may be different at different times. An access network access node may perform service identification on a service of the UE, and detect the service data flow of the UE. In this scenario, the bearer control method may include the following steps.

Step 300: The access network access node sends a service detection report to a PCRF, or the access network access node sends the service detection report to the PCRF by using an MME.

Step 310: The access network access node receives QoS information returned by the PCRF, or the access network access node receives, by using the MME, the QoS information returned by the PCRF.

Step 320: The access network access node allocates the service data flow of the UE to the air interface bearer according to the QoS information.

Specifically, in a case in which a service identification function in the access network access node detects the service data flow of the UE, the service flow detection report may be generated, and the service flow detection report is reported to the PCRF. Refer to the related description of establishing a PDN connection policy session in the bearer control method of Embodiment 2 of the present invention. In a possible implementation manner, the access network access node may directly send the service detection report to the PCRF. In another possible implementation manner, the access network access node may send the service detection report to the PCRF by using the MME. After receiving the service flow detection report, the PCRF may provide the QoS information for the access network access node. Refer to the related description of establishing the PDN connection policy session in the bearer control method of Embodiment 2 of the present invention. In a possible implementation manner, the access network access node may directly receive the QoS information returned by the PCRF. In another possible implementation manner, the access network access node may receive the QoS information returned by the PCRF by using the MME.

In a possible implementation manner, another node in a network may also have a service identification function. In a case in which another node in the network detects the service data flow of the UE by means of service identification, the service flow detection report may also be sent to the PCRF, so that PCRF may provide the QoS information for the access network access node, and subsequently perform matching between the service data flow and the air interface bearer.

The access network access node may receive the QoS information sent by the PCRF, match the service data flow of the UE with different air interface bearers according to the requirement of the QoS information, that is, match the service data flow that has a same requirement of the QoS information with a same air interface bearer, and establish a mapping relationship between the service data flow, the QoS information, and the air interface bearer. In a possible implementation manner, for a specific requirement of the QoS information, a dedicated air interface bearer may need to be modified or added between the access network access node and the UE.

After the mapping relationship between the service data flow, the QoS information, and the air interface bearer is established, the access network access node may send the foregoing mapping relationship to the UE in the RRC connection reconfiguration of the UE by using an RRC connection reconfiguration message, where the RRC connection reconfiguration message may include a mapping relationship between the service data flow of the UE and the air interface bearer, and may further include an identifier of an air interface resource allocated by the access network access node to the UE, and the identifier of the air interface resource may be used to indicate an air interface resource that is used by the UE to transmit, on the air interface bearer, the service data flow of the UE. In this way, the service data flow of the UE may be transmitted on the matching air interface bearer, and in this case, the access network access node may return a QoS information execution response to the PCRF.

According to the bearer control method in this embodiment, a function of an MME is simplified by performing hierarchical management on a bearer between UE and a network; an access network access node controls transmission of a service data flow on the air interface bearer according to QoS information. This enhances management on an air interface resource status by the access network access node, further, improves network resource management efficiency and a network capacity, reduces power consumption, and provides a basis for further evolution of a mobile network.

Embodiment 4

Figure 4:
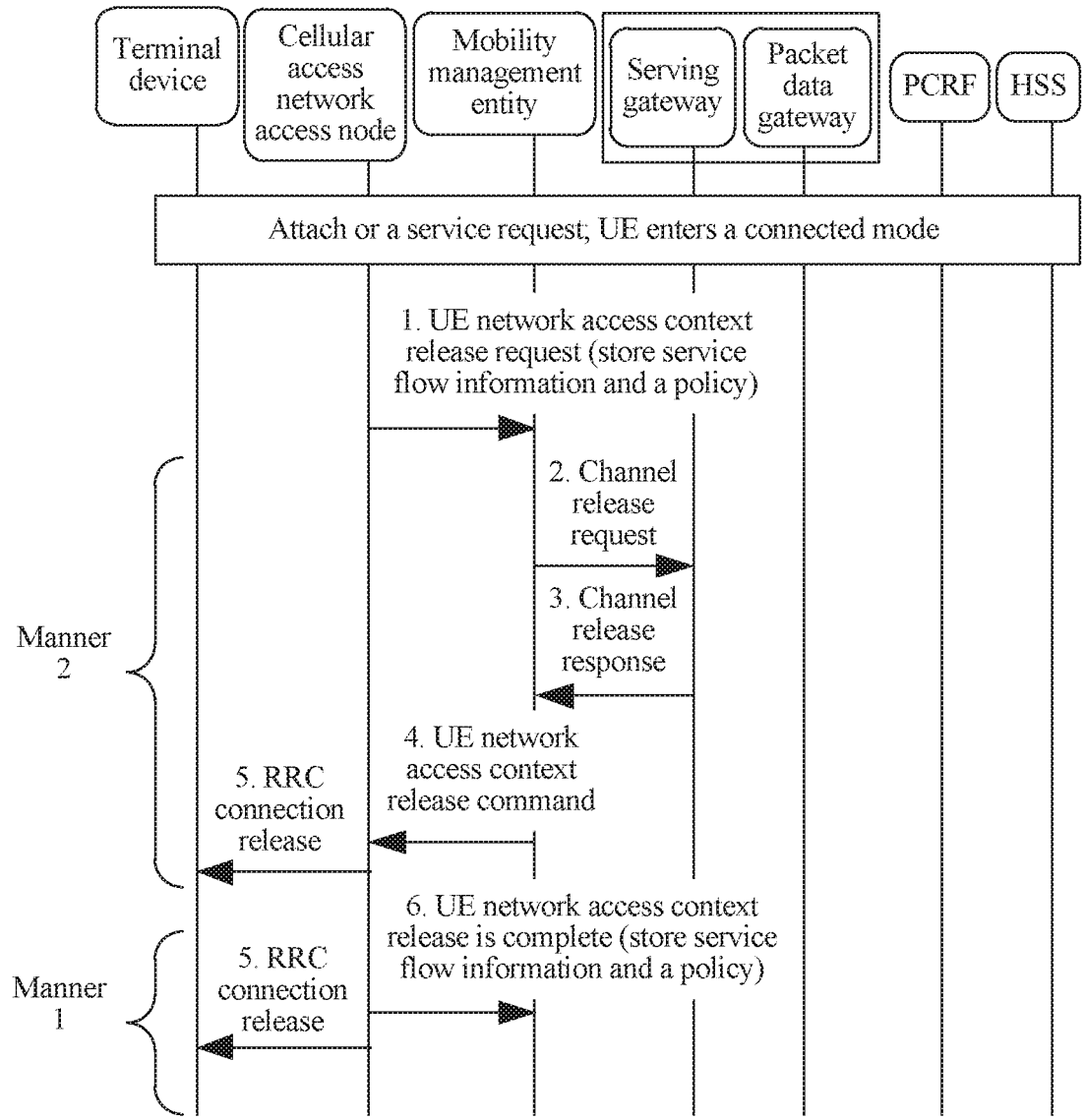
FIG. 4 is a diagram of a scenario of a bearer control method according to Embodiment 4.

FIG. 4 is a diagram of a scenario of a bearer control method according to Embodiment 4.

After a PDN connection is established between UE and a network, if a service data flow of the UE is detected, an access network access node may receive QoS information from a PCRF, and match the service data flow with an air interface bearer according to a requirement of the QoS information, so that uplink data and downlink data are transmitted. In the foregoing process, the access network access node needs to allocate an air interface resource to the UE, and may save, in each node of the network, a context related to the UE, for example, service data flow information and the QoS information. In a process of transmitting the service data flow by the UE, intermediate data may be generated in each node of the network, thereby occupying a memory of each node of the network, a port between the nodes of the network, and the like. However, the UE may not have a service data flow that needs to be transmitted in a period of time, that is, the UE is in an idle state. In this case, to save a network resource, reduce burden on each node of the network, and improve a storage capability of each node of the network, an air interface resource occupied by the UE in an idle state and the context of the UE saved in each node of the network may be released. As shown in FIG. 4, the releasing process may be performed in the following two manners.

Manner 1: In a case in which the access network access node detects that the UE does not have a service data flow in a first preset period of time, first connection information between the access network access node and the UE is released, the context of the UE is stored in the access network access node, and the downlink data of the UE is buffered in the access network access node. The first connection information is at least one of: a mapping relationship between the service data flow of the UE and the air interface bearer, or the air interface resource allocated by the access network access node to the UE.

Specifically, if the access network access node detects that the UE does not have a service data flow that needs to be transmitted in the first preset period of time (for example, 2 hours), that is, the UE is in an idle state, or a non-activity timer of the UE expires, the first connection information of the UE may be released, that is, at least one of the mapping relationship between the service data flow of the UE and the air interface bearer in the access network access node or the air interface resource allocated by the access network access node to the UE is released.

The access network access node may send an RRC connection release request to the UE, so as to instruct to release the first connection information between the access network access node and the UE. In this case, a PDN connection channel between the access network access node and a serving gateway is not released. When the downlink data arrives, the downlink data may be buffered in the access network access node after a packet data gateway sends the downlink data to the access network access node, and is used to subsequently trigger paging of the UE.

Manner 2: In a case in which the access network access node detects that the UE does not have a service data flow in the first preset period of time, the RRC connection and the second connection information between the access network access node and the serving gateway are released, the context of the UE is stored in an MME, and the downlink data of the UE is buffered in the serving gateway. The second connection information is at least one of: intermediate data generated when the service data flow is transmitted between the access network access node and the serving gateway, an occupied memory, an occupied port, or an occupied computing resource. The context of the UE includes at least one of: the service data flow of the UE, the QoS information, the air interface resource occupied by the UE, or a location area of the UE.

Specifically, if the access network access node detects that the UE does not have a service data flow that needs to be transmitted in the first preset period of time (for example, 2 hours), that is, the UE is in an idle state, or the non-activity timer of the UE expires, the second connection information between the RRC connection of the UE, the access network access node, and the serving gateway may be released, where the second connection information may include the intermediate data generated when the service data flow is transmitted between the access network access node and the serving gateway, the occupied memory, the occupied port, the occupied resource, and the like; and the context of the UE may include at least one of: the service data flow of the UE, the QoS information, the air interface resource occupied by the UE, or the location area of the UE.

The access network access node may send a UE network access context release request to the MME, so as to instruct to release a UE network access context saved in each node of the network, so that each node of the network may have a larger storage capacity. After receiving the UE network access context release request, the MME may send a channel release request to a core network gateway, so as to instruct the core network gateway to release the second connection information of the UE. After receiving the channel release request, the core network gateway may return a channel release response to the MME. The MME may return a UE network access context release command to the access network access node, so as to instruct the access network access node to release the second connection information of the UE.

In this case, the PDN connection channel between the access network access node and the serving gateway is already released. When the downlink data arrives, the downlink data may be buffered in the serving gateway after the packet data gateway sends the downlink data to the serving gateway, and is used to subsequently trigger paging of the UE.

It should be noted that when the access network access node sends the UE network access context release request to the MME and when UE network access context is released, the context of the UE, for example, the service data flow and the QoS information, may be stored in the MME.

In a possible implementation manner, to reduce processing burden of the access network access node and save a storage resource of the access network access node, two levels of non-activity timers of the UE may be disposed; and if the UE does not perform any activity in a relatively short period of time, the access network access node may release the first connection information in Manner 1; or if the UE does not perform any activity in a relatively long period of time, the access network access node may release the RRC connection and the second connection information in Manner 2.

According to the bearer control method in this embodiment, first connection information, or an RRC connection and second connection information are released when it is detected that UE is in an idle state, so that network resource management efficiency and a network capacity may be improved and power consumption may be reduced; further, hierarchical management on a bearer between the UE and a network may be implemented in two different release manners, thereby simplifying a function of an MME, and enhancing management on an air interface resource status by an access network access node.

Embodiment 5

Figure 5:
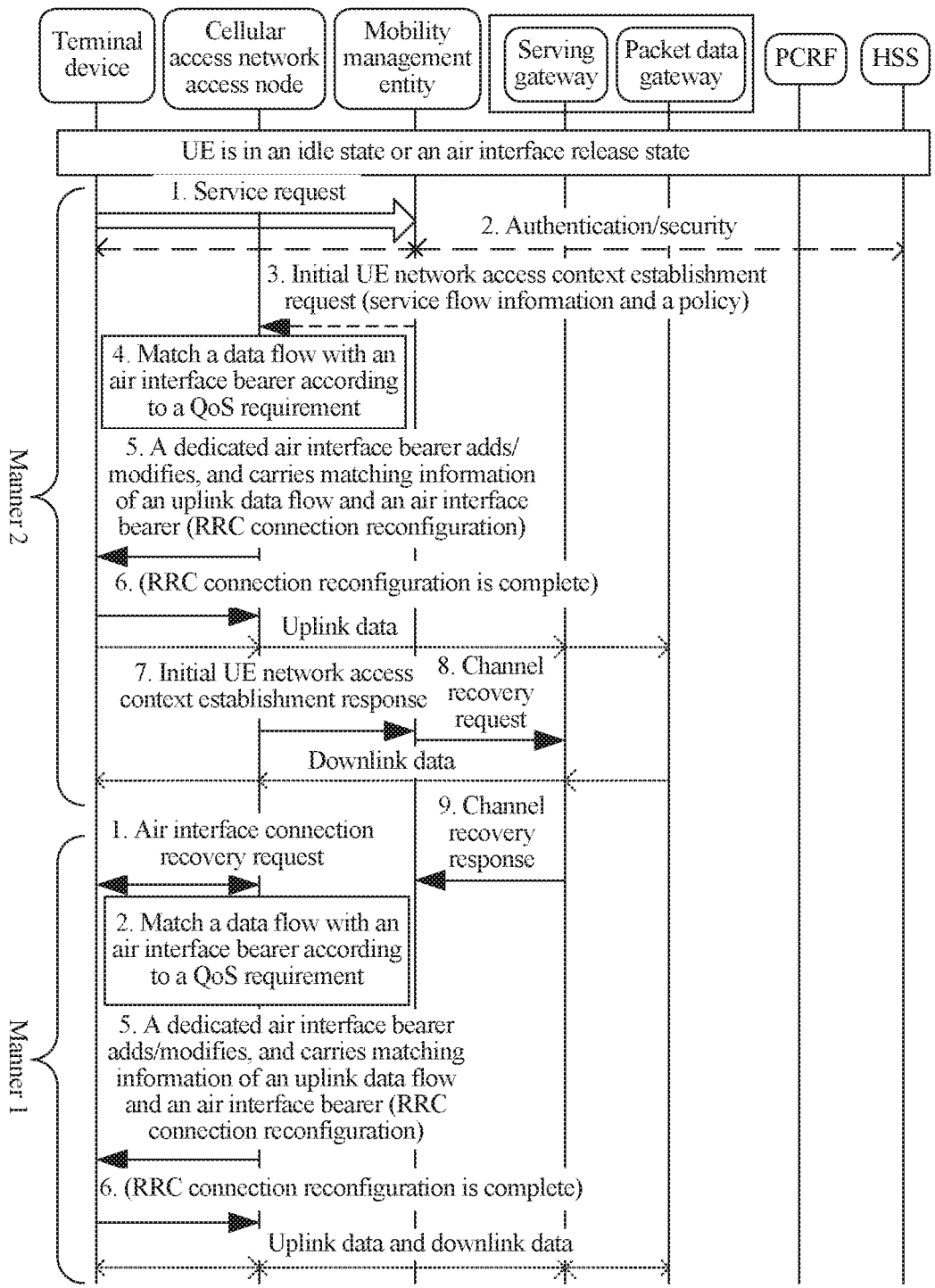
FIG. 5 is a diagram of a scenario of a bearer control method according to Embodiment 5.

FIG. 5 is a diagram of a scenario of a bearer control method according to Embodiment 5. As shown in FIG. 5, a UE in an idle state may regenerate a new service data flow. In this case, a UE network access context may be re-found according to a service request of the UE, and a connection between the UE and a core network gateway may be recovered. For two release manners of the bearer control method in Embodiment 4, a service request procedure of the UE may be performed in the following two manners.

Manner 1: The access network access node receives a recovery request sent by the UE; the access network access node allocates the new service data flow to the air interface bearer according to a stored context of the UE and according to the QoS information; and the access network access node allocates an air interface resource to the air interface bearer, so that the new service data flow is transmitted on the air interface bearer.

Specifically, refer to the release manner 1 of the bearer control method in Embodiment 4. The access network access node may store the UE network access context, and remain a PDN connection channel between the access network access node and a serving gateway. The UE may not send a service request to an MME any longer, and only an RRC connection needs to be recovered between the UE and the access network access node. The access network access node may match the new service data flow of the UE with the air interface bearer according to a requirement that is of the QoS information and that is in the UE network access context stored in the access network access node. Refer to a related description of the bearer control method in Embodiment 2 of the present invention. In an RRC connection reconfiguration process, a dedicated air interface bearer may need to be modified or established between the UE and the access network access node. After the RRC connection reconfiguration is completed, the UE may transmit, on a corresponding air interface bearer, the service data flow by using a corresponding air interface resource.

Manner 2: Before the steps in Manner 1, the following steps may further be included: receiving, by the access network access node, an initial UE network access context establishment request sent by the MME, where the initial UE network access context establishment request carries the context that is of the UE and that is stored by the MME and uplink channel information allocated by the serving gateway to the PDN connection, and the uplink channel information includes an IP address and a port number of the UE, so that uplink data of the UE is transmitted between the access network access node and the serving gateway; and returning an initial UE network access context establishment response to the MME, where the initial UE network access context establishment response carries downlink channel information allocated by the access network access node to the PDN connection, and the uplink channel information includes the IP address and the port number of the UE, so that downlink data of the UE is transmitted between the access network access node and the serving gateway.

Specifically, the UE may send a service request to the MME. Optionally, the MME may perform authentication on the UE according to subscription information that is of the UE and that is saved in an HSS, so as to ensure security of a network. After receiving a service request of the UE, the MME may send the initial UE network access context establishment request to the access network access node, where the initial UE network access context establishment request may carry the context of the UE that is stored in the MME after a release procedure of an air interface connection is executed in Embodiment 4 of the present invention, for example, service flow information and the QoS information, and may further carry the downlink channel information allocated by the serving gateway to the PDN connection.

Further, the access network access node may match the new service data flow of the UE with the air interface bearer according to the requirement of the QoS information in the context of the UE. Refer to a related description of the bearer control method in Embodiment 2 of the present invention. In an RRC connection reconfiguration process, a dedicated air interface bearer may need to be modified or established between the UE and the access network access node. After the RRC connection reconfiguration is completed, the UE may send uplink data. The access network access node may send the initial UE network access context establishment response to the MME, where the initial UE network access context establishment response may carry the downlink channel information allocated by the MME to the PDN connection. In this case, the downlink data buffered in the serving gateway may be sent to the UE by using the MME.

According to the bearer control method in this embodiment, after a service request of UE is received, a connection between a core network gateway and the UE is recovered according to different release manners, so that network resource management efficiency and a network capacity may be improved and power consumption may be reduced; further, hierarchical management on a bearer between the UE and a network is implemented, thereby simplifying a function of an MME, and enhancing management on an air interface resource status by an access network access node.

Embodiment 6

Figure 6A:
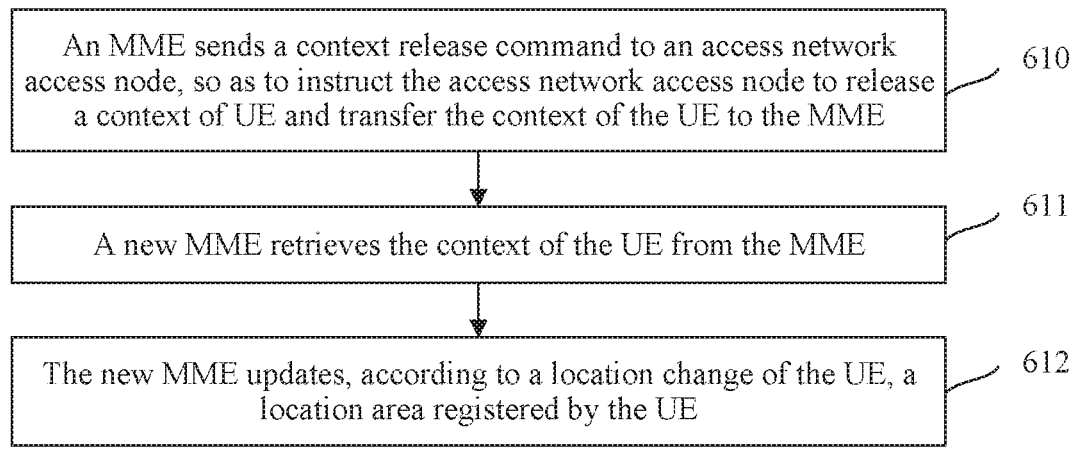
FIG. 6a to FIG. 6c are diagrams of a bearer control method according to Embodiment 6.
Figure 6B:
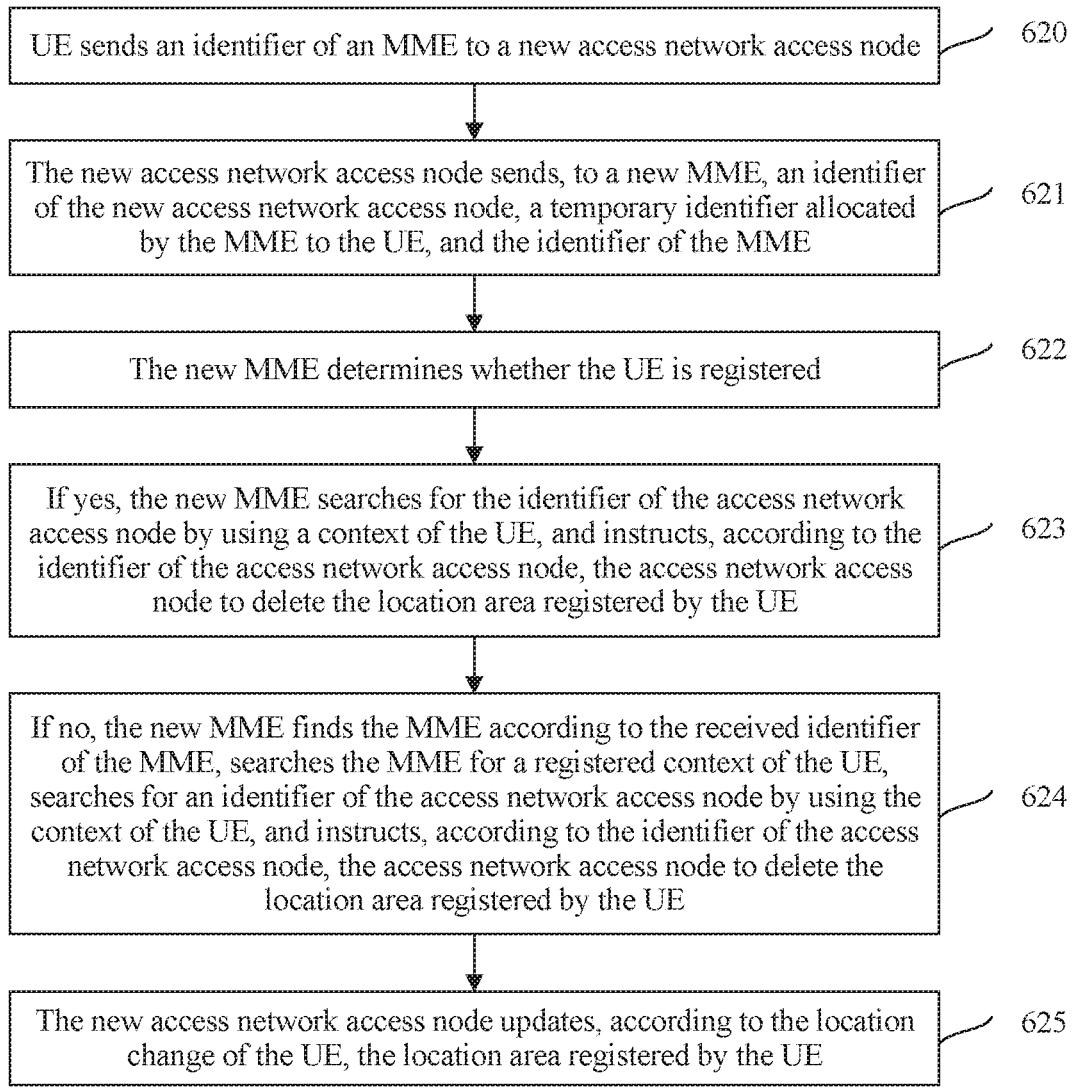
Figure 6C:
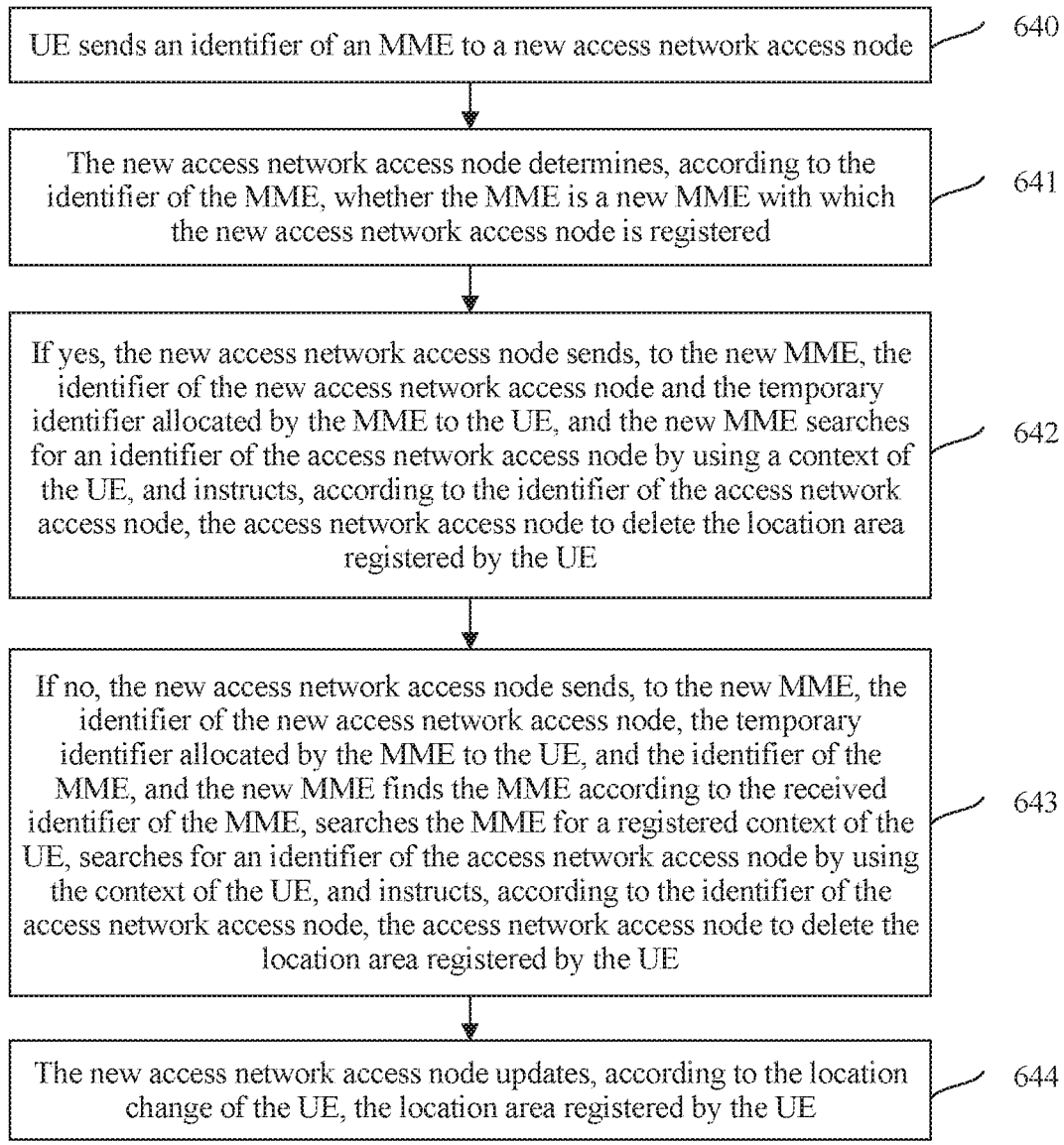

FIG. 6a to FIG. 6c are flowcharts of a bearer control method according to Embodiment 6. As shown in FIG. 6a to FIG. 6c, in the foregoing network architecture, management on a location area of UE may include two manners. Specifically, in a process of using the UE, a location may change. Therefore, in a network, the location area of the UE needs to be managed. A management manner may include the following two manners.

Manner 1: Location area management is completely performed by an MME.

Manner 2: An access network access node manages a paging area in the access network access node, and an MME manages a node identifier when the UE moves between different access network access nodes.

For nodes of the network in which the UE is located, such as the access network access node, the MME, and a serving gateway, there may be multiple situations of a location change of the UE. For example, the UE completely moves from an original access network access node to an access network access node that is not under control of the original MME, and the serving gateway also changes. If any one of or multiple of the original access network access node, the MME, and the serving gateway do not change, a location update procedure may be simplified.

In a possible implementation manner, as shown in FIG. 6a, the location area of the UE is managed by the MME, a context of the UE is stored in the MME, and when a location of the UE changes, the bearer control method may include the following steps.

Step 610: The MME sends a context release command to the access network access node, so as to instruct the access network access node to release the context of the UE and transfer the context of the UE to the MME. The context of the UE includes at least one of: a service data flow of the UE, the QoS information, a mapping relationship between the service data flow of the UE and an air interface bearer, an air interface resource occupied by the UE, or a location area of the UE.

Step 611: A new MME retrieves the context of the UE from the MME.

Step 612: The new MME updates, according to a location change of the UE, a location area registered by the UE.

Specifically, in the embodiments, because the access network access node shares responsibility for some transactions of the UE, for example, matches, according to the QoS information, the service data flow of the UE with different air interface bearers for transmission, in addition to a context generated when the MME manages the UE, the context of the UE further includes a context generated when the access network access node manages the UE. When the location of the UE changes, this part of the context needs to be retrieved from the access network access node.

In a possible implementation manner, as shown in FIG. 6b, the location area of the UE is managed by the access network access node, the MME manages a node identifier when the UE moves between different access network access nodes, and when the location of the UE changes, the bearer control method may further include the following steps.

Step 620: The UE sends an identifier of the MME to a new access network access node.

Step 621: The new access network access node sends, to a new MME, an identifier of the new access network access node, a temporary identifier allocated by the MME to the UE, and the identifier of the MME.

Step 622: The new MME determines whether the UE is registered.

Step 623: If yes, the new MME searches for the identifier of the access network access node by using a context of the UE, and instructs, according to the identifier of the access network access node, the access network access node to delete the location area registered by the UE.

Step 624: If no, the new MME finds the MME according to the received identifier of the MME, searches the MME for a registered context of the UE, searches for an identifier of the access network access node by using the context of the UE, and instructs, according to the identifier of the access network access node, the access network access node to delete the location area registered by the UE.

Step 625: The new access network access node updates, according to the location change of the UE, the location area registered by the UE.

For example, if an access network access node 1 may complete registration with an MME 1, the UE accesses the network by using the access network access node 1, and performs transmission of the service data flow. The MME 1 may allocate a temporary identifier to the UE, and in addition, the UE may obtain an identifier of the MME 1. When the location of the UE changes and the UE moves to an access network access node 2, where the access network access node 2 may complete registration with an MME 2, the UE may send the identifier of the MME 1 to the access network access node 2. The access network access node 2 sends, to the MME 2, an identifier of the access network access node 2, the temporary identifier allocated by the MME 1 to the UE, and the identifier of the MME 1. After receiving the identifier of the access network access node 2, the temporary identifier allocated by the MME 1 to the UE, and the identifier of the MME 1, the MME 2 may determine whether the UE is registered with the MME 2. If yes, it indicates that the MME 2 may save the context of the UE, and may find, in the context of the UE, the identifier of the access network access node 1, and instruct the corresponding access network access node 1 to delete the location area registered by the UE; or if no, the MME 2 may find the MME 1 according to the received identifier of the MME 1, searches the MME 1 for a registered context of the UE, searches for the identifier of the access network access node 1 by using the context of the UE, and instructs, according to the identifier of the access network access node 1, the corresponding access network access node 1 to delete the location area registered by the UE. Finally, the access network access node 2 updates, according to the location change of the UE, the location area registered by the UE, that is, re-registers a location area for the UE.

In a possible implementation manner, as shown in FIG. 6c, if the location area of the UE is managed by the access network access node, the MME manages the node identifier when the UE moves between different access network access nodes, and when the location of the UE changes, the bearer control method may further include the following steps.

Step 640: The UE sends the identifier of the MME to the new access network access node.

Step 641: The new access network access node determines, according to the identifier of the MME, whether the MME is the new MME with which the new access network access node is registered.

Step 642: If yes, the new access network access node sends, to the new MME, the identifier of the new access network access node and the temporary identifier allocated by the MME to the UE, and the new MME searches for an identifier of the access network access node by using the context of the UE, and instructs, according to the identifier of the access network access node, the access network access node to delete the location area registered by the UE.

Step 643: If no, the new access network access node sends, to the new MME, the identifier of the new access network access node, the temporary identifier allocated by the MME to the UE, and the identifier of the MME, and the new MME finds the MME according to the received identifier of the MME, searches the MME for a registered context of the UE, searches for an identifier of the access network access node by using the context of the UE, and instructs, according to the identifier of the access network access node, the access network access node to delete the location area registered by the UE.

Step 644: The new access network access node updates, according to the location change of the UE, the location area registered by the UE.

Specifically, a difference from the foregoing possible implementation manner is that the access network access node may first perform determining once, and determine, according to a determining result, whether the identifier of the MME needs to be sent to the new MME.

A description is given with reference to the foregoing example. The UE may send the identifier of the MME 1 to the access network access node 2, and the access network access node 2 may determine, according to the received identifier of the MME 1, whether the MME 1 is the MME with which the access network access node 2 is registered. If yes, the access network access node 2 may send, to the MME 2, the identifier of the access network access node 2 and the temporary identifier allocated by the MME 1 to the UE, and after receiving the identifier of the access network access node 2 and the temporary identifier allocated by the MME 1 to the UE, the MME 2 searches, by using the context that is of the UE and that is saved in the MME 2, for the identifier of the access network access node 1, and instructs, by using the identifier, the corresponding access network access node 1 to delete the location area registered by the UE; or if no, the access network access node 2 may send, to the MME 2, the identifier of the access network access node 2, the temporary identifier allocated by the MME 1 to the UE, and the identifier of the MME 1, and the MME 2 finds the corresponding MME 1 according to the received identifier of the MME 1, searches the registered context of the UE from the MME 1, searches the identifier of the access network access node 1 by using the context of the UE, and instructs, according to the identifier of the access network access node 1, the corresponding access network access node 1 to delete the location area registered by the UE. Finally, the access network access node 2 updates, according to the location change of the UE, the location area registered by the UE, that is, re-registers a location area for the UE.

In a possible implementation manner, in a case in which the UE is in an idle state in a relatively long period of time, that is, in a case in which no service data flow needs to be transmitted, if the context of the UE is stored in the MME, the location area of the UE is managed by the access network access node, and the MME manages the node identifier when the UE moves between different access network access nodes; when a location manner of the UE changes, that is, the UE initiates a location update or has a new service data flow, the access network access node may retrieve the context of the UE from the MME, where the context may include a mobility context used when the access network access node manages the UE, that is, a location area originally allocated to the UE; and process a location update request, or re-allocate a location area to the UE according to the location of the UE.

For example, if the UE completely moves from the original access network access node to an access network access node that is not under control of the original MME, and the serving gateway also changes, for example, the access network access node changes from the access network access node 2 into the access network access node 1, the MME changes from the MME 2 into the MME 1, and the serving gateway changes from the serving gateway 2 into the serving gateway 1, in the location update procedure, the location area of the UE may be managed in Manner 1. The UE may send a location update message to the MME 1. The MME 1 may establish a PDN connection channel between the MME 1, a serving gateway 1, and a packet data gateway; the location area of the UE is updated in an HSS; the location area of the UE originally registered, by the MME 2, in HSS is canceled; if the MME 2 stores the context of the UE, the MME 1 may obtain the context of the UE from the MME 2, or if the access network access node 2 stores the context of the UE, the MME 2 needs to retrieve the context of the UE from the access network access node 2, and transfer the context to the MME 1; a PDN session connection between the MME 2 and a serving gateway 2 is deleted.

In a possible implementation manner, for the foregoing situation, the location area of the UE may be managed in Manner 2. The UE may initiate a paging area update on the access network access node 1, and the access network access node 1 initiates access node update on the MME 1. In this process, a node identifier of the access network access node may be carried, and the MME 1 may update the access network access node by managing the node identifier. The access network access node 1 may manage the paging area update of the UE. For management on the context of the UE and the PDN connection channel, refer to the related description of the foregoing bearer control method in this embodiment.

In a possible implementation manner, if the location area of the UE is updated, and the serving gateway does not change, according to the related description of the foregoing bearer control method in this embodiment, the PDN connection channel between the MME and a core network gateway does not need to be updated. Therefore, a procedure may be simplified.

In a possible implementation manner, if the location area of the UE is updated, and the MME does not change, according to the related description of the foregoing bearer control method in this embodiment, the context of the UE does not need to be transferred between the MMEs. In addition, only registration of the location of the UE needs to be updated in an HSS, and the registration of the location does not need to be deleted. If the MME stores the context of the UE, the context of the UE may be directly used. If the access network access node stores the context of the UE, the MME may find the corresponding access network access node and retrieve the context of the UE for subsequent management.

It should be noted that the foregoing implementation manners described in this embodiment are merely some possible implementation manners of the bearer control method, and the present invention is not limited thereto. The bearer control method in this embodiment may further have many possible implementation manners according to a specific situation of the UE location update, a storage location of the context of the UE, and a management manner for the location area of the UE.

According to the bearer control method in this embodiment, a function of an MME is simplified by performing hierarchical management on a bearer between UE and a network. This enhances management on a context of the UE by an access network access node, further, improves network resource management efficiency and a network capacity, reduces power consumption, and provides a basis for further evolution of a mobile network.

Embodiment 7

Figure 7:
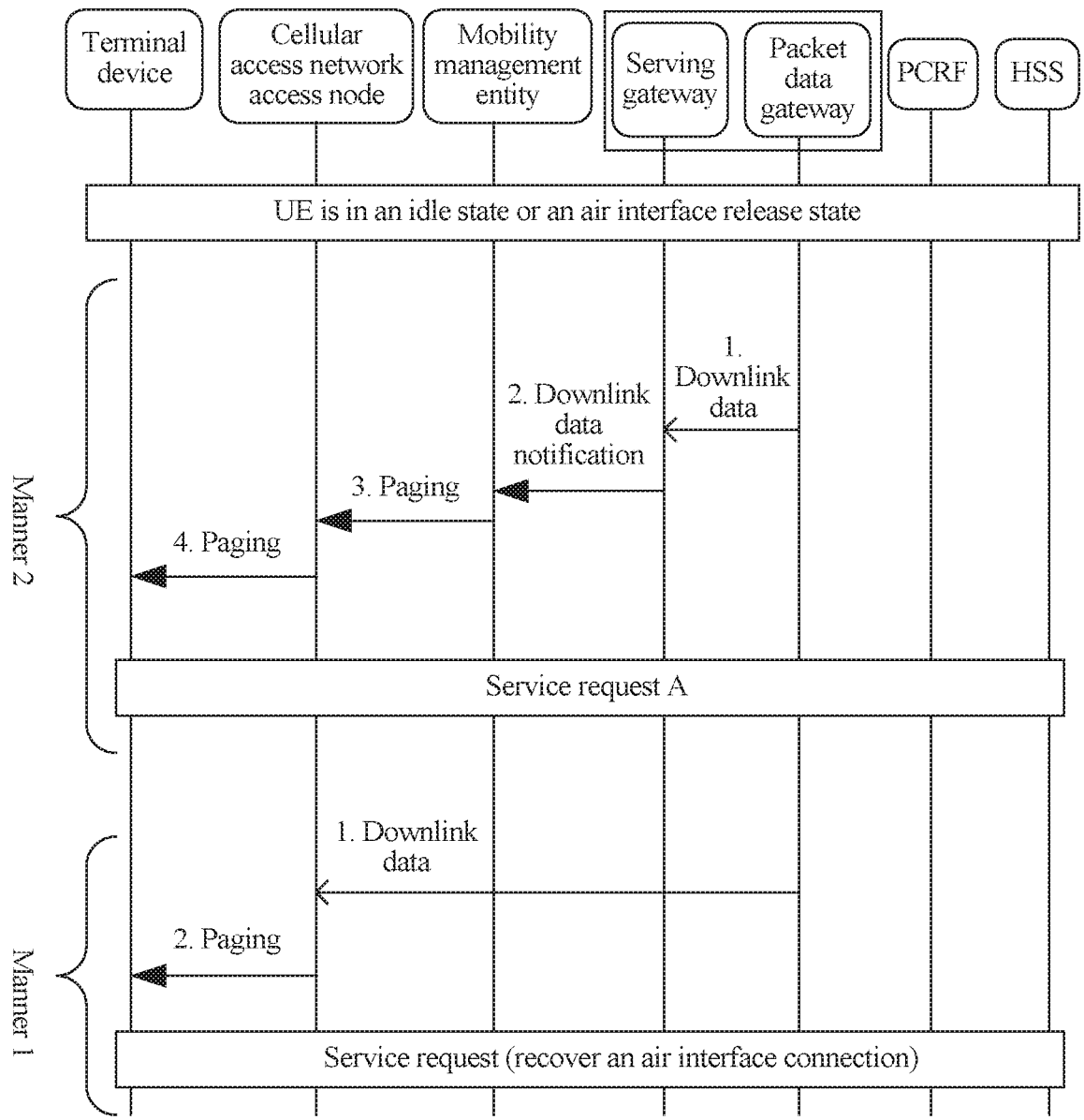
FIG. 7 is a diagram of a scenario of a bearer control method according to Embodiment 7.

FIG. 7 is a diagram of a scenario of a bearer control method according to Embodiment 7. As shown in FIG. 7, after a location of UE is updated, a new service data flow is generated, and paging of the UE needs to be initiated.

According to the related description of the foregoing embodiment, downlink data of the UE may be buffered in an access network access node, or may be buffered in a serving gateway. A paging procedure may include: receiving, by the access network access node, the downlink data of the UE, or receiving downlink data sent by the serving gateway; and initiating paging of the UE in a location area registered by the UE.

The paging procedure may further include: receiving, by an MME, the downlink data of the UE from the serving gateway, and sending a paging message to the access network access node, so as to instruct the access network access node to initiate paging of the UE; or receiving, by the access network access node, the paging message, and initiating paging of the UE in the location area registered by the UE.

Specifically, if the release Manner 2 in the foregoing embodiment is used, when second connection information between an RRC connection, the access network access node, and the serving gateway is already released, and the serving gateway receives the downlink data, the serving gateway may buffer the downlink data and send a downlink data notification to the MME; after receiving the downlink data notification, the MME may send the paging message to the access network access node, so as to instruct the access network access node to page the UE. If management on the location area of the UE is performed in Manner 1 in the bearer control method in Embodiment 6 of the present invention and is completely performed by the MME, the MME may add the location area registered by the UE to the paging message sent by the access network access node; the access network access node may page the UE in a corresponding cell according to the location area registered by the UE. If management on the location area of the UE is performed in Manner 2 in the bearer control method in Embodiment 6, a paging area in the access network access node is managed by the access network access node, and the MME manages a node identifier when the UE moves between different access network access nodes; the MME sends the paging message to the access network access node, and the access network access node may page the UE in a corresponding cell according to the paging area registered by the UE.

If the release Manner 1 in the foregoing embodiment is used, only first connection information between the UE and the access network access node is released, and the access network access node may receive the downlink data and buffer the downlink data. If management on the location area of the UE is performed in Manner 1 in the bearer control method in Embodiment 6 and is completely performed by the MME, the access network access node may page the UE in a corresponding cell according to the location area registered by the UE. If management on the location area of the UE is performed in Manner 2 in the bearer control method in Embodiment 6, a paging area in the access network access node is managed by the access network access node, and the MME manages a node identifier when the UE moves between different access network access nodes; the access network access node may page the UE in a corresponding cell according to the paging area registered by the UE.

According to the bearer control method in this embodiment, a function of an MME is simplified by performing hierarchical management on a bearer between UE and a network. This enhances management on a context of the UE by an access network access node, further, improves network resource management efficiency and a network capacity, reduces power consumption, and provides a basis for further evolution of a mobile network.

Embodiment 8

Figure 8:
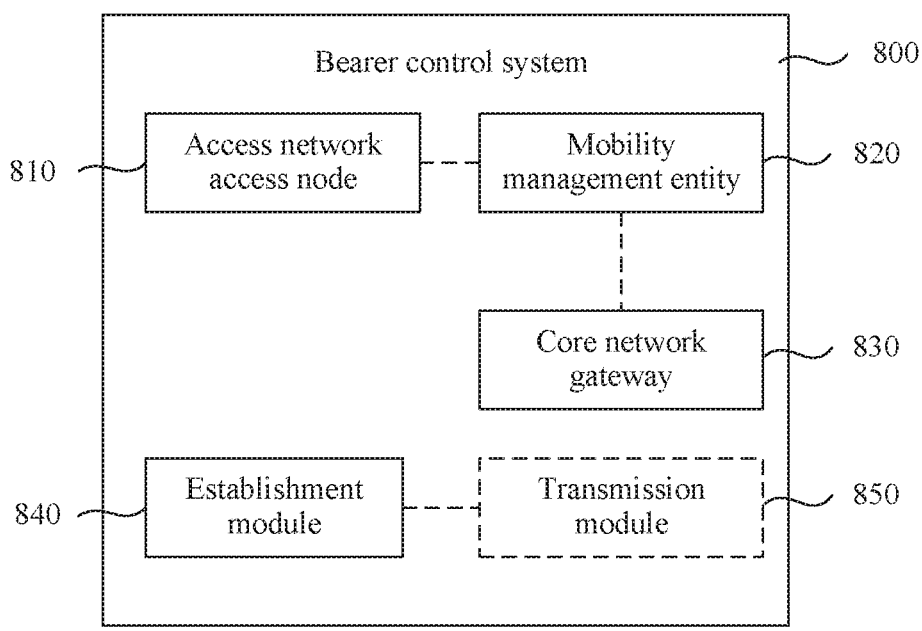
FIG. 8 is a structural block diagram of a bearer control system according to Embodiment 8.

FIG. 8 is a structural block diagram of a bearer control system according to Embodiment 8. As shown in FIG. 8, the bearer control system 800 may mainly include: an access network access node 810; a mobility management entity 820; and a core network gateway 830. The system may also include an establishment module 840, configured to establish a packet data network (PDN) connection when a terminal device UE accesses a network. The system may also include a transmission module 850, configured to: identify and transmit a service data flow of the UE on an air interface bearer between the UE and the access network access node according to obtained quality of service (QoS) information, and transmit the service data flow by using a transmission tunnel between the access network access node and the core network gateway, or directly send the service data flow to a packet data network by using the access network access node.

Specifically, in a process of accessing the network by the UE, network access registration first needs to be performed, and authentication is performed on the UE by obtaining subscription information between the UE and the network. The subscription information may be saved in a home subscriber server (HSS). The foregoing network access registration process of the UE is an attach procedure. After the attach procedure, the UE already accesses the network. However, to perform data transmission between networks, that is, to complete a corresponding subscriber service, the establishment module 840 further needs to add a PDN policy session, so as to establish a PDN connection between the UE and the network. The HSS is a database storing user subscription information, and the subscription information may include: a user category, a service use right, a quality-of-service class, a charging mode, and the like that are negotiated by the user with an operator.

After the establishment module 840 establishes the PDN connection, the UE may receive the QoS information from a policy and charging rule function (PCRF) decision point by using the PDN connection. The transmission module 850 may identify the service data flow of the UE according to a requirement of the QoS information. Further, a data path of a granularity of the foregoing PDN connection may include an air interface bearer part and a transmission tunnel part. The air interface bearer is a transmission path between the UE and the access network access node 810 (for example, an eNodeB). The transmission module 850 may identify the service data flow of the UE according to the requirement of the received QoS information, and service data flows that do not meet the requirement of the QoS information are separately matched with different air interface bearers. The access network access node 810 may separately allocate an air interface resource to different air interface bearers, so as to transmit the service data flow of the UE. The transmission tunnel part is the transmission tunnel between the access network access node 810 and the PCRF, may be used to transmit the service data flow between the access network access node and the PCRF, and does not require that the service data flow is identified according to the requirement of the QoS information. Alternatively, in a case in which the access network access node 810 already accesses the network and has a network interface, the access network access node 810 may directly send, by using a transmission module 850 to a packet data network, the service data flow that is received from the UE by using the air interface bearer.

In a possible implementation manner, the data path of the granularity of the PDN connection established between the access network access node 810 and the core network gateway 830 bears all uplink data and downlink data of the PDN connection of the UE. In a case in which the UE changes into an idle state, that is, in a case in which no service data flow needs to be transmitted, context information of the UE saved in each network node may be deleted and released on the data path, so as to improve network resource utilization. In addition, the data path may be reserved. When the UE initiates a location update on another access network access node, the data path between the original access network access node 810 and the core network gateway 830 may be deleted. When the UE initiates a service request, that is, in a case in which a service data flow needs to be transmitted, the data path of the granularity of the PDN connection that is of the UE and that is between the access network access node 810 in which the UE initiates the service request and the core network gateway 830 may be recovered.

In a possible implementation manner, in the foregoing system, for specific examples of the access network access node 810, the core network gateway 830, and the mobility management entity 820, refer to the related description of the bearer control method in Embodiment 1. Details are not described herein again.

According to the bearer control system in this embodiment, a function of an MME is simplified by performing hierarchical management on a bearer between UE and a network; an access network access node controls transmission of a service data flow on the air interface bearer according to QoS information. This enhances management on an air interface resource status by the access network access node, further, improves network resource management efficiency and a network capacity, reduces power consumption, and provides a basis for further evolution of a mobile network.

Embodiment 9

Figure 9:
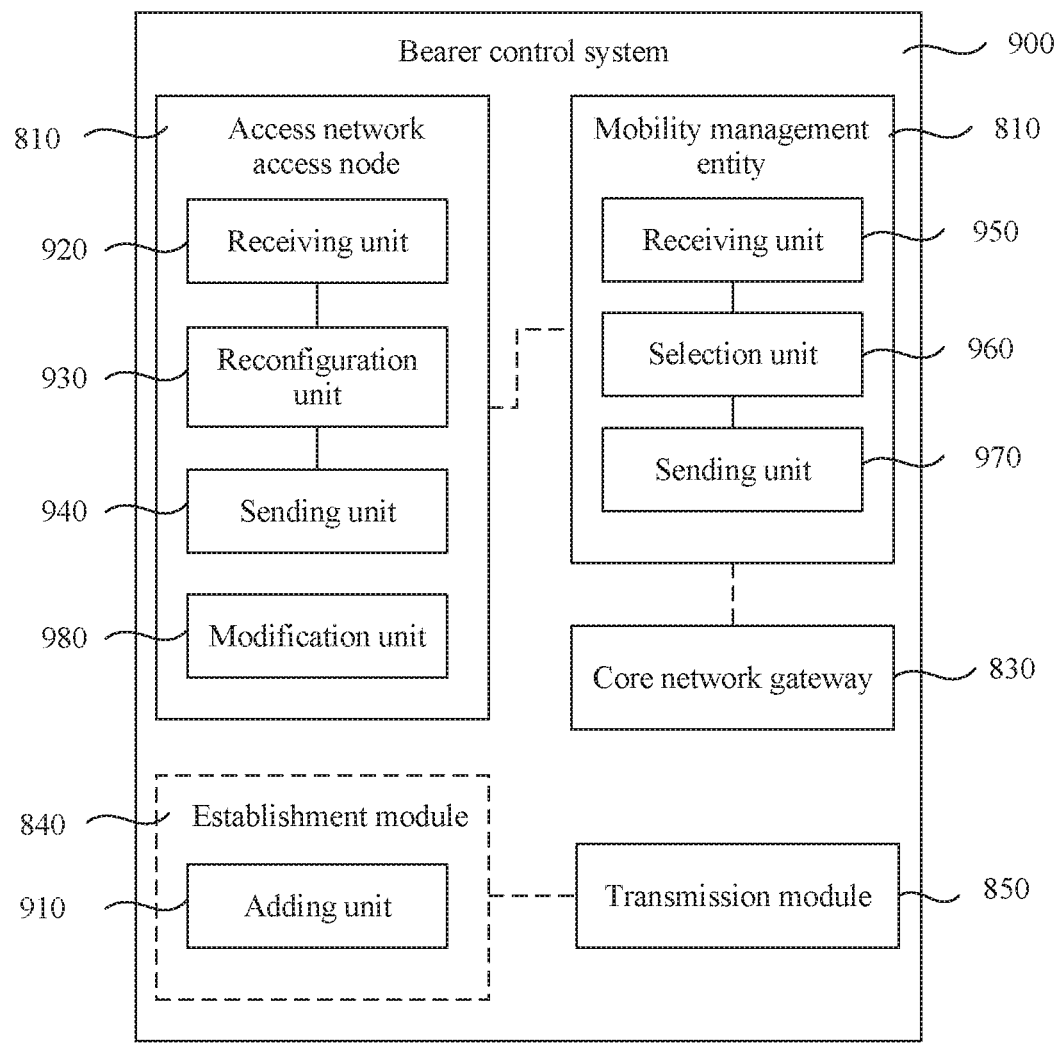
FIG. 9 is a structural block diagram of a bearer control system according to Embodiment 9.

FIG. 9 is a structural block diagram of a bearer control system according to Embodiment 9. Components that have a same reference sign in FIG. 9 and FIG. 8 have a same function. For brevity, detailed descriptions about these components are omitted.

As shown in FIG. 9, a main difference between the bearer control system 900 shown in FIG. 9 and the bearer control system shown 800 in FIG. 8 is that the establishment module 840 may specifically include: an adding unit 910, configured to: add a PDN connection policy session to an access network control session between the access network access node and a PCRF; or add the PDN connection policy session between the access network access node and the MME and/or between the MME and the PCRF.

Specifically, on one hand, after UE completes an attach procedure, each node in a network, for example, the access network access node 810 or the MME 820, may save identification information of the UE. On the other hand, in a process of establishing a PDN connection, each node in the network, for example, the access network access node 810 or the MME 820, may further save identification information of a PDN. The access network access node 810 or the MME 820 may find a corresponding PCRF in the network by using the saved identification information of the UE and the saved identification information of the PDN, and initiate establishing of the PDN connection policy session. If all PDN connections of the UE are served by one PCRF, the adding unit 910 may add the PDN connection policy session to the access network control session between the access network access node 810 and the PCRF. If all PDN connections of the UE are respectively served by multiple PCRFs, the adding unit 910 may add the PDN connection policy session between the access network access node 810 and the MME 820, and the MME 820 and the PCRF establish the PDN connection policy session between the MME 820 and the PCRF.

In a possible implementation manner, the access network access node 810 may include: a receiving unit 920, configured to: receive the QoS information sent by the PCRF, or receive, by using the MME, the QoS information sent by the PCRF; and a reconfiguration unit 930, connected to the receiving unit 920, configured to: perform radio resource control RRC connection reconfiguration between the UE and the access network node according to the QoS information, and allocate an air interface resource to the air interface bearer.

Specifically, the receiving unit 920 of the access network access node 810 may directly receive the QoS information from the PCRF by using the foregoing transmission path, or may receive the QoS information from the PCRF by using the MME 820, so that the access network access node 810 may subsequently identify a service data flow of the UE according to the QoS information, and complete the radio resource control (RRC) connection reconfiguration.

Further, after the receiving unit 920 of the access network access node 810 receives the QoS information, the reconfiguration unit 930 may identify the service data flow of the UE according to a requirement of the QoS information, establish a mapping relationship between different service data flows that meet different requirements of the QoS information and different air interface bearers, and allocate, to different air interface bearers, the air interface resource, that is, the air interface resource used when different service data flows are transmitted on different air interface bearers.

The access network access node 810 may further include: a sending unit 940, configured to: send an RRC connection reconfiguration message to the UE, and allocate the air interface resource to the air interface bearer. The receiving unit 920 is further configured to receive an RRC connection reconfiguration success response from the UE.

The RRC connection reconfiguration message includes the mapping relationship between the service data flow of the UE and the air interface bearer and an identifier of the air interface resource, and the identifier of the air interface resource is used to indicate the air interface resource used by the UE to transmit, on the air interface bearer, the service data flow. The receiving unit 920 may receive the RRC connection reconfiguration success response from the UE, so that the RRC connection reconfiguration process is completed.

In a possible implementation manner, the access network access node 810 may further obtain the QoS information (such as bandwidth, a priority, a delay, and a packet loss rate) of the service data flow by using uplink and downlink data flows that are of the UE and that are identified by the access network access node 810. Further, if the UE transmits the service data flow by using the foregoing data path, a node in a network (for example, the MME 820) may save a context of the UE, including the mapping relationship that is between the service data flow and the QoS information and that is in the context. In this case, the access network access node 810 may obtain, from the MME 820, the mapping relationship that is between the service data flow and the QoS information and that is in the context, allocate an uplink resource and downlink resources (especially air interface radio resources) to the UE, map the uplink and downlink resources to the air interface bearer, and send, by using the RRC connection reconfiguration message to the UE, the mapping relationship between the service data flow and the air interface bearer and the air interface resource that is used when the UE transmits, on the air interface bearer, the service data flow.

In a possible implementation manner, the core network gateway 830 may include a serving gateway (SGW) and/or a packet data gateway (PGW). The MME 820 may specifically include: a receiving unit 950, configured to receive a PDN connection establishment request sent by the UE, where the PDN connection establishment request carries a PDN identifier access point name APN; a selection unit 960, connected to the receiving unit 950, configured to select the core network gateway according to the APN and subscription information of the UE; a sending unit 970, connected to the selection unit 960, configured to send a session establishment request to the core network gateway, where the session establishment request carries first channel information allocated by the serving gateway to the PDN connection, the first channel information includes an IP address and a port number that are of a first channel and that are allocated by the access network access node to the UE, and the first channel information is used to establish the first channel between the serving gateway and the packet data gateway. The receiving unit 950 is further configured to receive a session establishment response from the core network gateway, where the session establishment response carries second channel information allocated by the packet data gateway to the PDN connection, the second channel information includes an IP address and a port number that are of a second channel and that are allocated by the core network gateway to the UE, and the second channel information is used to establish the second channel between the packet data gateway and the serving gateway. The first channel and the second channel form the transmission tunnel, which is used to transmit the service data flow between the access network access node and the core network gateway.

For a specific example, refer to the related description in the bearer control method of Embodiment 2 of the present invention. Details are not described herein again.

The access network access node 810 may further include a modification unit 980. In a process of establishing the PDN connection, an initial air interface bearer may be established between the UE and the access network access node, where the initial air interface bearer may include a dedicated air interface bearer. After the access network access node 810 receives the QoS information, the modification unit 980 may add or modify the dedicated air interface bearer according to a requirement of the QoS information, where the dedicated air interface bearer is established according to at least one of a scheduling priority, a delay, a packet loss rate, or a bandwidth requirement in the QoS information, and the dedicated air interface bearer carries matching information of the service data flow and the dedicated air interface bearer.

According to the bearer control system in this embodiment, a function of an MME is simplified by performing hierarchical management on a bearer between UE and a network; an access network access node controls transmission of a service data flow on the air interface bearer according to QoS information. This enhances management on an air interface resource status by the access network access node, further, improves network resource management efficiency and a network capacity, reduces power consumption, and provides a basis for further evolution of a mobile network.

Embodiment 10

Figure 10:
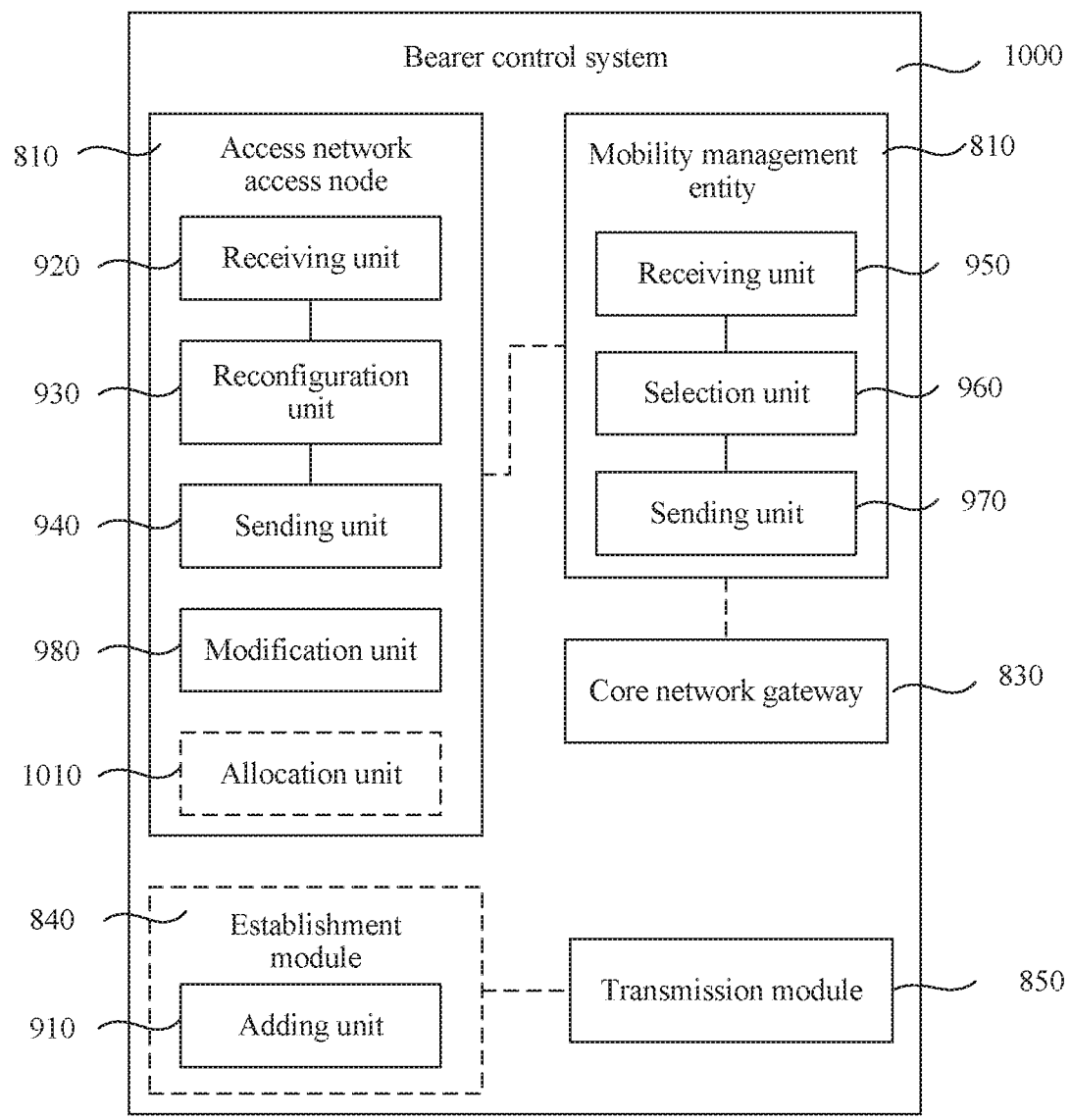
FIG. 10 is a structural block diagram of a bearer control system according to Embodiment 10.

FIG. 10 is a structural block diagram of a bearer control system according to Embodiment 10. After a PDN connection is established, a service data flow of UE may change. For example, the service data flow of the UE may be different at different times. An access network access node 810 may perform service identification on a service of the UE, and detect the service data flow of the UE.

As shown in FIG. 10, the access network access node 810 of the bearer control system 1000 may further include an allocation unit 1010. When the access network access node 810 detects the service data flow of the UE, the sending unit 940 is further configured to send a service detection report to the PCRF, and the receiving unit 920 is further configured to receive the QoS information returned by the PCRF; or the sending unit 940 is further configured to send a service detection report to the PCRF by using the MME, and a receiving unit 920 is further configured to receive, by using the MME, the QoS information returned by the PCRF; and the allocation unit 1010 is configured to allocate the service data flow of the UE to the air interface bearer according to the QoS information.

For a specific example, refer to the related description in the bearer control method of Embodiment 3. Details are not described herein again.

According to the bearer control system in this embodiment, a function of an MME is simplified by performing hierarchical management on a bearer between UE and a network; an access network access node controls transmission of a service data flow on the air interface bearer according to QoS information. This enhances management on an air interface resource status by the access network access node, further, improves network resource management efficiency and a network capacity, reduces power consumption, and provides a basis for further evolution of a mobile network.

Embodiment 11

Figure 11:
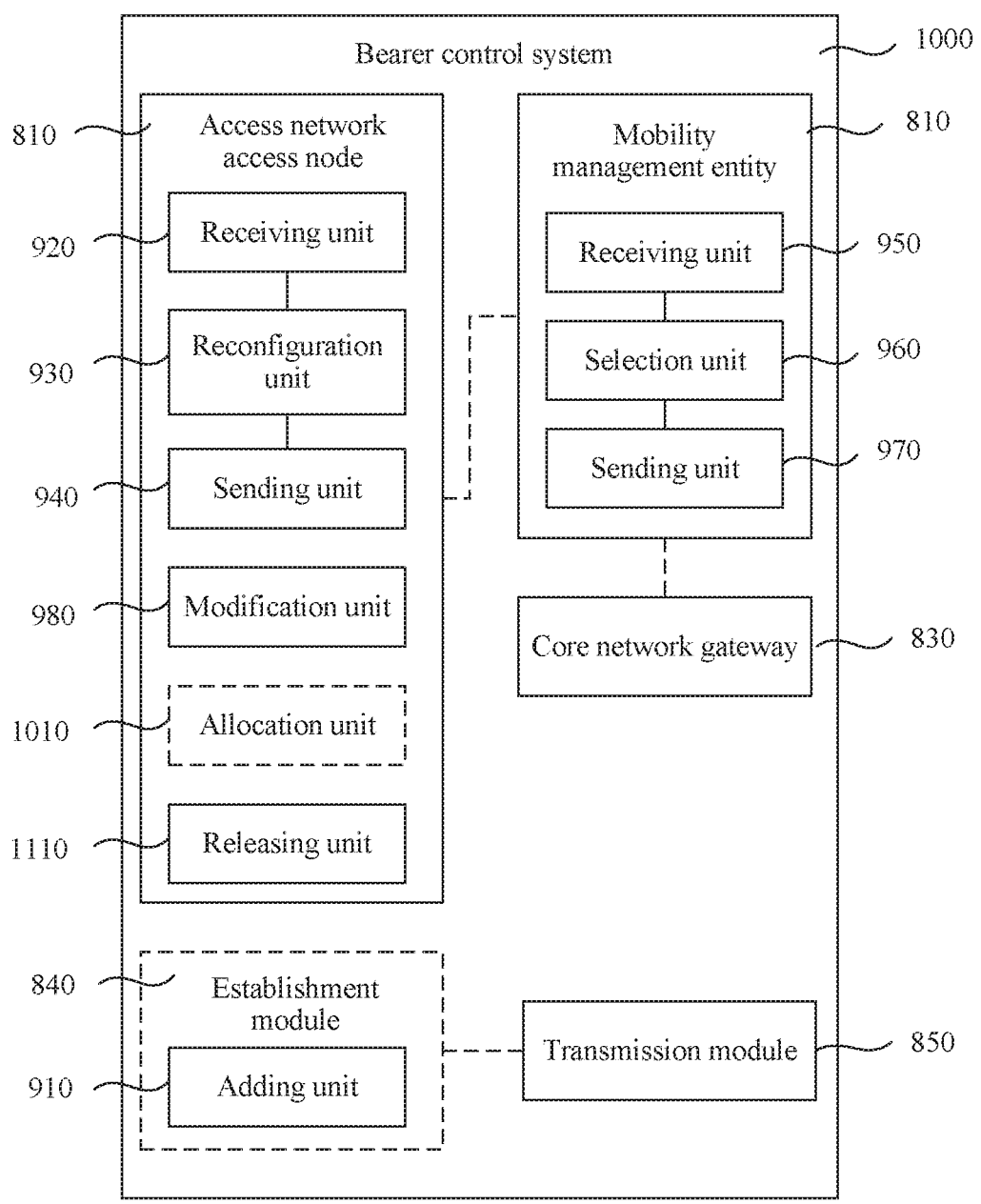
FIG. 11 is a structural block diagram of a bearer control system according to Embodiment 11.

FIG. 11 is a structural block diagram of a bearer control system according to Embodiment 11.

After a PDN connection is established between UE and a network, if a service data flow of the UE is detected, an access network access node 810 may receive QoS information from a PCRF, and match the service data flow with an air interface bearer according to a requirement of the QoS information, so that uplink data and downlink data are transmitted. In the foregoing process, the access network access node 810 needs to allocate an air interface resource to the UE, and may save, in each node of the network, a context related to the UE, for example, service data flow information and the QoS information. In a process of transmitting the service data flow by the UE, intermediate data may be generated in each node of the network, thereby occupying a memory of each node of the network, a port between the nodes of the network, and the like. However, the UE may not have a service data flow that needs to be transmitted in a period of time, that is, the UE is in an idle state. In this case, to save a network resource, reduce burden on each node of the network, and improve a storage capability of each node of the network, an air interface resource occupied by the UE in an idle state and the context of the UE saved in each node of the network may be released.

As shown in FIG. 11, the access network access node 810 may further include a releasing unit 1110.

In a case in which the access network access node 810 detects that the UE does not have a service data flow in a first preset period of time, the releasing unit 1110 is configured to: release first connection information between the access network access node and the UE, store the context of the UE in the access network access node, and buffer the downlink data of the UE in the access network access node, where the first connection information is at least one of: the mapping relationship between the service data flow of the UE and the air interface bearer, or the air interface resource allocated by the access network access node to the UE.

In a case in which the access network access node 810 detects that the UE does not have a service data flow in the first preset period of time, the releasing unit 1110 is further configured to: release second connection information between an RRC connection, the access network access node, and a serving gateway, store the context of the UE in an MME, and buffer the downlink data of the UE in the serving gateway, where the second connection information is at least one of: intermediate data generated when the service data flow is transmitted between the access network access node and the serving gateway, an occupied memory, an occupied port, or an occupied computing resource; and the context of the UE includes at least one of: the service data flow of the UE, the QoS information, the air interface resource occupied by the UE, or a location area of the UE.

For a specific example, refer to the related description of the bearer control method in Embodiment 4. Details are not described herein again.

Further, UE in an idle state may regenerate a new service data flow. In this case, a UE network access context may be re-found according to a service request of the UE, and a connection between the UE and a core network gateway 830 may be recovered.

The receiving unit 920 is further configured to receive a recovery request sent by the UE.

The allocation unit 1010 is further configured to allocate the new service data flow to the air interface bearer according to the stored context of the UE and the QoS information.

The allocation unit 1010 is further configured to allocate the air interface resource to the air interface bearer, so that the new service data flow is transmitted on the air interface bearer.

For a specific example, refer to the related description of the bearer control method in Embodiment 5. Details are not described herein again.

According to the bearer control system in this embodiment, when it is detected that UE is in an idle state, a releasing unit releases first connection information, or an RRC connection and second connection information. When a new service request of the UE is received, a connection between the UE and a core network gateway is recovered in different release manners, so that network resource management efficiency and a network capacity may be improved and power consumption may be reduced; further, hierarchical management on a bearer between the UE and a network may be implemented in two different release manners, thereby simplifying a function of an MME, and enhancing management on an air interface resource status by an access network access node.

Embodiment 12

In a bearer control system, a location area of UE may include two manners. Specifically, in a process of using the UE, a location may change. Therefore, in a network, the location area of the UE needs to be managed. A management manner may include the following two manners.

Manner 1: Location area management is completely performed by an MME 820.

Manner 2: An access network access node 810 manages a paging area in the access network access node 810, and the MME 820 manages a node identifier when the UE moves between different access network access nodes 810.

For nodes of the network in which the UE is located, such as the access network access node 810 and the MME 820, there may be multiple situations of a location change of the UE. For example, the UE completely moves from an original access network access node to an access network access node that is not under control of the original MME, and the serving gateway also changes. If any one of or multiple of the original access network access node, the MME, and the serving gateway do not change, a location update procedure may be simplified.

Figure 12A:
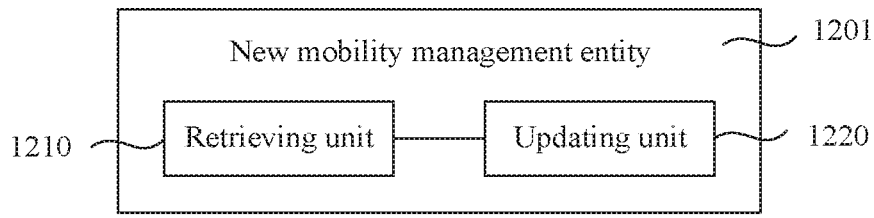
FIG. 12a to FIG. 12c are structural block diagrams of a new MME and/or a new access network access node according to Embodiment 12.

In a possible implementation manner, as shown in FIG. 12*a*, a new MME 1201 to which the UE moves may include a retrieving unit 1210 and an updating unit 1220. If a location area of the UE is managed by the MME, a context of the UE is stored in the MME, and when the location of the UE changes, the sending unit 970 of the MME is further configured to send a context release command to the access network access node, so as to instruct the access network access node to release the context of the UE and transfer the context of the UE to the MME, where the context of the UE includes at least one of: the service data flow of the UE, the QoS information, a mapping relationship between the service data flow of the UE and the air interface bearer, an air interface resource occupied by the UE, or a location area of the UE.

The retrieving unit 1210 is configured to retrieve the context of the UE from the MME.

The updating unit 1220 is connected to the retrieving unit 1210, and is configured to update, according to a location change of the UE, a location area registered by the UE.

Figure 12B:
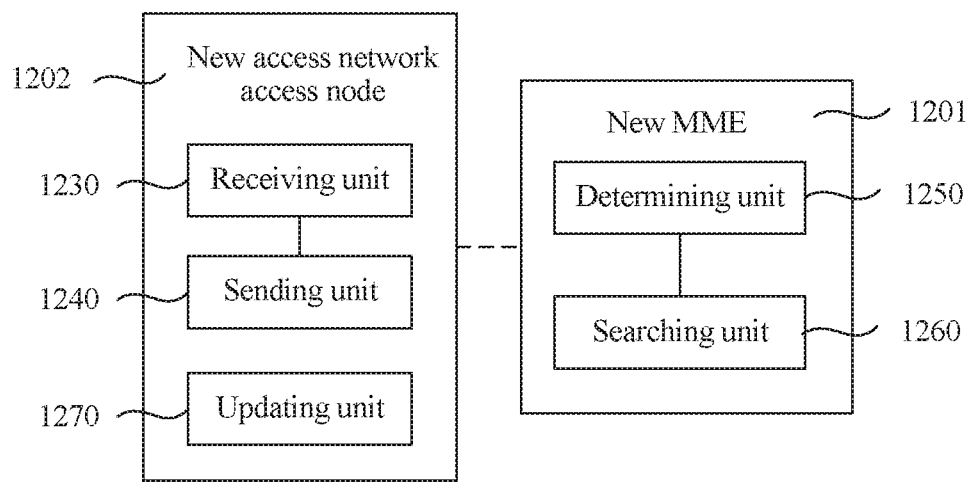

In a possible implementation manner, as shown in FIG. 12*b*, the location area of the UE is managed by the access network access node, the MME manages a node identifier when the UE moves between different access network access nodes, and when the location of the UE changes, a new access network access node 1202 to which the UE moves may include: a receiving unit 1230, configured to receive an identifier of the MME from the UE; and a sending unit 1240, connected to the receiving unit 1230, configured to send, to a new MME, an identifier of the access network access node, a temporary identifier allocated by the MME to the UE, and the identifier of the MME. The new MME 1201 further includes: a determining unit 1250, configured to determine whether the UE is registered; and a searching unit 1260, in a case in which it is determined that the UE is registered, configured to: search for an identifier of the access network access node by using a context of the UE, and instruct, according to the identifier of the access network access node, the access network access node to delete a location area registered by the UE; or in a case in which it is determined that the UE is not registered, configured to: find the MME according to the received identifier of the MME, search the MME for a registered context of the UE, search for an identifier of the access network access node by using the context of the UE, and instruct, according to the identifier of the access network access node, the access network access node to delete the location area registered by the UE. The new access network access node 1202 further includes: an updating unit 1270, configured to update, according to a location change of the UE, the location area registered by the UE.

Figure 12C:
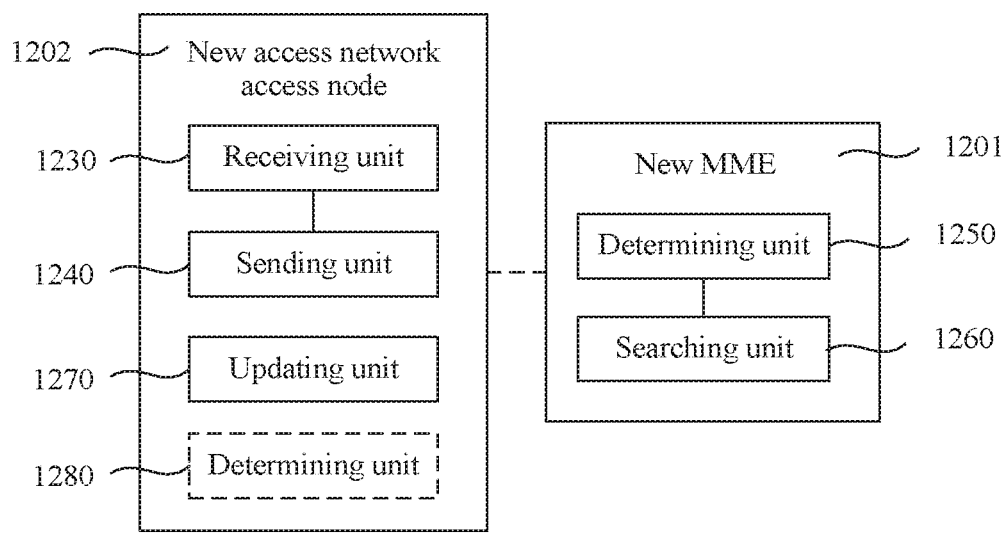

In a possible implementation manner, as shown in FIG. 12c, the location area of the UE is managed by the access network access node, the MME manages a node identifier when the UE moves between different access network access nodes, and when the location of the UE changes, the new access network access node 1202 to which the UE moves may further include: a determining unit 1280, configured to determine, according to the identifier of the MME, whether the MME is the new MME with which the new access network access node is registered. The sending unit 1240 is further configured to: in a case in which a determining result is yes, send, to the new MME, the identifier of the access network access node 1202 and the temporary identifier allocated by the MME to the UE; or the sending unit 1240 is further configured to: in a case in which a determining result is no, send, to the new MME, the identifier of the access network access node 1202, the temporary identifier allocated by the MME to the UE, and the identifier of the MME.

For a specific example, refer to the related description of the bearer control method in Embodiment 6 of the present invention. Details are not described herein again.

In a possible implementation manner, after a location of UE is updated, a new service data flow is generated, and paging of the UE needs to be initiated.

According to the related description of the foregoing embodiment, downlink data of the UE may be buffered in an access network access node, or may be buffered in a serving gateway. In a possible implementation manner, the receiving unit 920 of the access network access node is further configured to: receive the downlink data of the UE, or receive downlink data sent by the serving gateway; and initiate paging of the UE in the location area registered by the UE. In another possible implementation manner, the receiving unit 950 of the MME is further configured to receive the downlink data of the UE from the serving gateway; the sending unit 970 of the MME is further configured to send a paging message to the access network access node, so as to instruct the access network access node to initiate paging of the UE; and the receiving unit 920 of the access network access node is further configured to: receive the paging message, and initiate paging of the UE in the location area registered by the UE.

For a specific example, refer to the related description of the bearer control method in Embodiment 7. Details are not described herein again.

According to the bearer control system in this embodiment, a function of an MME is simplified by performing hierarchical management on a bearer between UE and a network. This enhances management on a context of the UE by an access network access node, further, improves network resource management efficiency and a network capacity, reduces power consumption, and provides a basis for further evolution of a mobile network.

Embodiment 13

Figure 13:
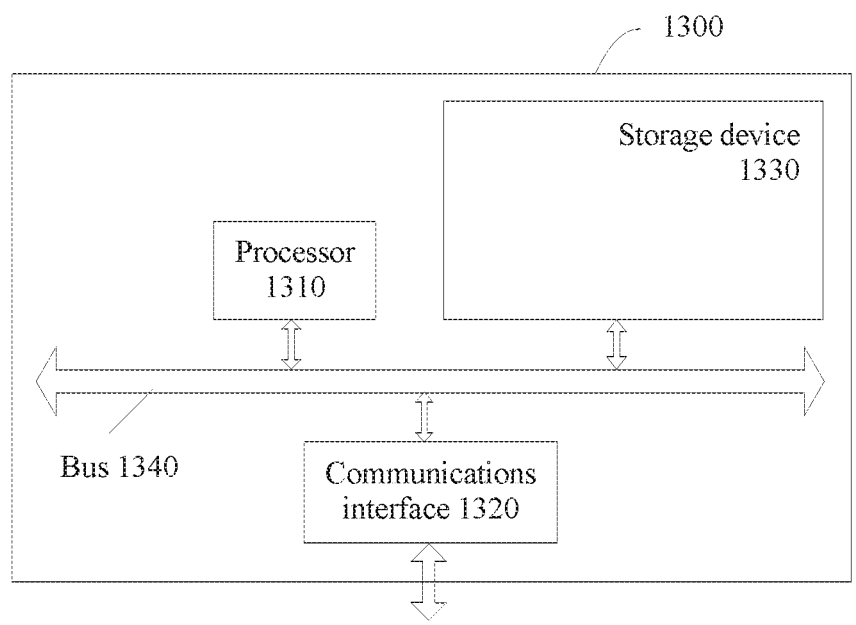
FIG. 13 is a structural block diagram of a bearer control system according to Embodiment 13.

FIG. 13 is a structural block diagram of a bearer control system 1300 according to Embodiment 13. The bearer control system 1300 may be a host server having computing power, a personal computer PC, a portable computer or terminal, or the like. A specific embodiment of the present invention imposes no limitation on specific implementation of a computing node.

The bearer control system 1300 includes a processor 1310, a communications interface 1320, a memory 1330, and a bus 1340. The processor 1310, the communications interface 1320, and the memory 1330 complete communication between them by using the bus 1340.

The communications interface 1320 is configured to communicate with a network device, where the network device includes a virtual machine management center, a shared storage, and the like.

The processor 1310 is configured to execute a program. The processor 1310 may be a central processing unit CPU or an application specific integrated circuit (ASIC), or may be configured to be one or more integrated circuits that implement this embodiment.

The memory 1330 is configured to store a file. The memory 1330 may include a high-speed RAM memory, and may further include a non-volatile memory, for example, at least one disk storage device. Alternatively, the memory 1330 may be a storage device array. The memory 1330 may be divided into blocks, and the blocks may form a virtual volume according to a specific rule.

In a possible implementation manner, the foregoing program may be program code that includes a computer operation instruction. The program is applied to a network architecture supporting multiple access technologies, and may be specifically used to: establish a packet data network (PDN) connection when a terminal device UE accesses a network; and identify and transmit a service data flow of the UE on an air interface bearer between the UE and an access network access node according to obtained quality of service (QoS) information, and transmit the service data flow by using a transmission tunnel between the access network access node and a core network gateway, or directly send the service data flow to a packet data network by using the access network access node.

In a possible implementation manner, the establishing a packet data network (PDN) connection when a terminal device UE accesses a network includes: adding a PDN connection policy session to an access network control session between the access network access node and a PCRF; or adding the PDN connection policy session between the access network access node and a mobility management entity MME and/or between the MME and the PCRF.

In a possible implementation manner, before the identifying and transmitting a service data flow of the UE on an air interface bearer between the UE and an access network access node according to obtained QoS information, the foregoing program is further configured to: receive, by the access network access node, the QoS information sent by the PCRF, or receive, by the access network access node by using the MME, the QoS information sent by the PCRF; and perform, by the access network access node, radio resource control RRC connection reconfiguration between the UE and the access network node according to the QoS information, and allocate an air interface resource to the air interface bearer.

In a possible implementation manner, the performing, by the access network access node, radio resource control protocol RRC connection reconfiguration includes: sending, by the access network access node, an RRC connection reconfiguration message to the UE, and allocating the air interface resource to the air interface bearer; and receiving, by the access network access node, an RRC connection reconfiguration success response from the UE. The RRC connection reconfiguration message includes a mapping relationship between the service data flow of the UE and the air interface bearer and an identifier of the air interface resource, and the identifier is used to indicate the air interface resource used by the UE to transmit, on the air interface bearer, the service data flow.

In a possible implementation manner, the core network gateway includes a serving gateway and/or a packet data gateway, and before the transmitting the service data flow by using a transmission tunnel between the access network access node and a core network gateway, the foregoing program is further configured to: receive, by the MME, a PDN connection establishment request sent by the UE, where the PDN connection establishment request carries a PDN identifier access point name APN; select, by the MME, the core network gateway according to the APN and subscription information of the UE; send, by the MME, a session establishment request to the core network gateway, where the session establishment request carries first channel information allocated by the serving gateway to the PDN connection, the first channel information includes an IP address and a port number that are of a first channel and that are allocated by the access network access node to the UE, and the first channel information is used to establish the first channel between the serving gateway and the packet data gateway; and return, by the core network gateway, a session establishment response to the MME, where the session establishment response carries second channel information allocated by the packet data gateway to the PDN connection, the second channel information includes an IP address and a port number that are of a second channel and that are allocated by the core network gateway to the UE, and the second channel information is used to establish the second channel between the packet data gateway and the serving gateway; where the first channel and the second channel form the transmission tunnel, which is used to transmit the service data flow between the access network access node and the core network gateway.

In a possible implementation manner, when the access network access node detects the service data flow of the UE, the foregoing program is further configured to: send, by the access network access node, a service detection report to the PCRF, and receive the QoS information returned by the PCRF; or send, by the access network access node by using the MME, a service detection report to the PCRF, and receive, by using the MME, the QoS information returned by the PCRF; and allocate, by the access network access node, the service data flow of the UE to the air interface bearer according to the QoS information.

In a possible implementation manner, in a case in which the access network access node detects that the UE does not have a service data flow in a first preset period of time, the foregoing program is further configured to: release first connection information between the access network access node and the UE, store a context of the UE in the access network access node, and buffer downlink data of the UE in the access network access node, where the first connection information is at least one of: the mapping relationship between the service data flow of the UE and the air interface bearer, or the air interface resource allocated by the access network access node to the UE.

In a possible implementation manner, in a case in which the access network access node detects that the UE does not have a service data flow in a first preset period of time, the foregoing program is further configured to: release an RRC connection and second connection information that is between the access network access node and the serving gateway, store the context of the UE in the MME, and buffer the downlink data of the UE in the serving gateway, where the second connection information is at least one of: intermediate data generated when the service data flow is transmitted between the access network access node and the serving gateway, an occupied memory, an occupied port, or an occupied computing resource; and the context of the UE includes at least one of: the service data flow of the UE, the QoS information, the air interface resource occupied by the UE, or a location area of the UE.

In a possible implementation manner, when the UE has a new service data flow, the foregoing program is further configured to: receive, by the access network access node, a recovery request sent by the UE; allocate, by the access network access node, the new service data flow to the air interface bearer according to the stored context of the UE and the QoS information; and allocate, by the access network access node, the air interface resource to the air interface bearer, so that the new service data flow is transmitted on the air interface bearer.

In a possible implementation manner, the foregoing program is further configured to: add or modify, by the access network access node, a dedicated air interface bearer according to the QoS information, where the dedicated air interface bearer is established according to at least one of a scheduling priority, a delay, a packet loss rate, or a bandwidth requirement in the QoS information, and the dedicated air interface bearer carries matching information of the service data flow and the dedicated air interface bearer.

In a possible implementation manner, a location area of the UE is managed by an MME, a context of the UE is stored in the MME, and when a location of the UE changes, the following steps are further included: sending, by the MME, a context release command to the access network access node, so as to instruct the access network access node to release the context of the UE and transfer the context of the UE to the MME, where the context of the UE includes at least one of: the service data flow of the UE, the QoS information, a mapping relationship between the service data flow of the UE and the air interface bearer, an air interface resource occupied by the UE, or a location area of the UE; retrieving, by a new MME, the context of the UE from the MME; and updating, by the new MME according to a location change of the UE, a location area registered by the UE.

In a possible implementation manner, the location area of the UE is managed by the access network access node, the MME manages a node identifier when the UE moves between different access network access nodes, and when the location of the UE changes, the following steps are further included: sending, by the UE, the identifier of the MME to a new access network access node; sending, by the new access network access node to a new MME, an identifier of the new access network access node, a temporary identifier allocated by the MME to the UE, and the identifier of the MME; determining, by the new MME, whether the UE is registered; if yes, searching, by the new MME, for an identifier of the access network access node by using a context of the UE, and instructing, according to the identifier of the access network access node, the access network access node to delete a location area registered by the UE; or if no, finding, by the new MME, the MME according to the received identifier of the MME, searching the MME for a registered context of the UE, searching for an identifier of the access network access node by using the context of the UE, and instructing, according to the identifier of the access network access node, the access network access node to delete a location area registered by the UE; and updating, by the new access network access node according to the location change of the UE, the location area registered by the UE.

In a possible implementation manner, the location area of the UE is managed by the access network access node, the MME manages a node identifier when the UE moves between different access network access nodes, and when the location of the UE changes, the following steps are further included: sending, by the UE, the identifier of the MME to the new access network access node; determining, by the new access network access node according to the identifier of the MME, whether the MME is the new MME with which the new access network access node is registered; if yes, sending, by the new access network access node to a new MME, the identifier of the new access network access node and the temporary identifier allocated by the MME to the UE, searching, by the new MME, for an identifier of the access network access node by using the context of the UE, and instructing, according to the identifier of the access network access node, the access network access node to delete the location area registered by the UE; or if no, sending, by the new access network access node to the new MME, the identifier of the new access network access node, the temporary identifier allocated by the MME to the UE, and the identifier of the MME, finding, by the new MME, the MME according to the received identifier of the MME, searching the MME for a registered context of the UE, searching for an identifier of the access network access node by using the context of the UE, and instructing, according to the identifier of the access network access node, the access network access node to delete the location area registered by the UE; and updating, by the new access network access node according to the location change of the UE, the location area registered by the UE.

In a possible implementation manner, when the UE has a new service data flow, the foregoing program is further configured to: receive, by the access network access node, the downlink data of the UE, or receive downlink data sent by the serving gateway; and initiate paging of the UE in the location area registered by the UE.

In a possible implementation manner, the foregoing program is further configured to: receive, by the MME, a downlink data notification of the UE from the serving gateway, and send a paging message to the access network access node, so as to instruct the access network access node to initiate paging of the UE; or receive, by the access network access node, the paging message, and initiate paging of the UE in the location area registered by the UE.

A person of ordinary skill in the art may be aware that, exemplary units and algorithm steps in the embodiments described in this specification may be implemented by electronic hardware or a combination of computer software and electronic hardware. Whether the functions are implemented by hardware or software depends on particular applications and design constraint conditions of the technical solutions. A person skilled in the art may select different methods to implement the described functions for a particular application, but it should not be considered that the implementation goes beyond the scope of the present invention.

If the functions are implemented by computer software and are sold or used as independent products, it may be deemed, to some extent, that all or part (such as the part that contributes to the prior art) of the technical solutions of the present invention is embodied by a computer software product. The computer software product is generally stored in a computer readable non-volatile storage medium and includes several instructions for instructing a computer device (which may be a personal computer, a server, or a network device, and the like) to perform all or some steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   receiving, by an access network access node in a network supporting multiple access technologies, quality of service (QoS) information from a policy and charging rule function;
   allocating, by the access network access node, a resource to an air interface bearer between a user equipment (UE) and the access network access node, wherein the access network access node is wirelessly connected to the UE, and the air interface bearer is a transmission path between the UE and the access network access node;
   identifying, by the access network access node, one or more service data flows of the UE;
   allocating, by the access network access node, the one or more service data flows of the UE to the air interface bearer according to the QoS information; and
   sending, by the access network access node to the UE, a mapping relationship between the one or more service data flows of the UE and the air interface bearer.

2. The method according to claim 1, further comprising:
   transmitting, by the access network access node, the one or more service data flows of the UE on the air interface bearer.

3. The method according to claim 1, wherein the mapping relationship is carried in a radio resource control (RRC) connection reconfiguration message.

4. The method according to claim 1, wherein receiving the QoS information from the policy and charging rule function comprises:
   receiving, by the access network access node using a mobility management entity, the QoS information from the policy and charging rule function.

5. The method according to claim 1, further comprising:
receiving, by the access network access node, a second service data flow from the UE on the air interface bearer; and
transmitting, by the access network access node, the second service data flow to a core network gateway using a transmission tunnel between the access network access node and the core network gateway.

6. An apparatus, comprising:
a processor;
a communications interface;
a non-transitory memory; and
a bus;
wherein the processor is configured to execute a program stored in the memory, causing the processor to:
receive quality of service (QoS) information from a policy and charging rule function;
allocate a resource to an air interface bearer between a user equipment (UE) and an access network access node, wherein the access network access node is wirelessly connected to the UE, and the air interface bearer is a transmission path between the UE and the access network access node;
identify one or more service data flows of the UE;
allocate the one or more service data flows of the UE to the air interface bearer according to the QoS information; and
send a mapping relationship between the one or more service data flows of the UE and the air interface bearer to the UE.

7. The apparatus according to claim 6, wherein the processor is further configured to: transmit the one or more service data flows of the UE on the air interface bearer.

8. The apparatus according to claim 6, wherein the mapping relationship is carried in a radio resource control (RRC) connection reconfiguration message.

9. The apparatus according to claim 6, wherein the processor is further configured to:
receive, using a mobility management entity, the QoS information from the policy and charging rule function.

10. The apparatus according to claim 6, wherein the processor is further configured to:
receive a second service data flow from the UE on the air interface bearer; and
transmit the second service data flow to a core network gateway using a transmission tunnel between the access network access node and the core network gateway.

11. A system, comprising:
an access network access node; and
a policy and charging rule function, configured to send quality of service (QoS) information to the access network access node;
wherein the access network access node is configured to:
receive the QoS information from the policy and charging rule function;
allocate a resource to an air interface bearer between a user equipment (UE) and the access network access node, wherein the access network access node is wirelessly connected to the UE, and the air interface bearer is a transmission path between the UE and the access network access node;
identify one or more service data flows of the UE, and
allocate the one or more service data flows of the UE to the air interface bearer according to the QoS information; and
send a mapping relationship between the one or more service data flows of the UE and the air interface bearer to the UE.

12. The system according to claim 11, wherein the access network access node is further configured to:
transmit the one or more service data flows of the UE on the air interface bearer.

13. The system according to claim 11, wherein the mapping relationship is carried in a radio resource control (RRC) connection reconfiguration message.

14. The system according to claim 11, wherein the access network access node is further configured to:
receive, using a mobility management entity, the QoS information from the policy and charging rule function.

15. The system according to claim 11, wherein the access network access node is further configured to:
receive a second service data flow from the UE on the air interface bearer; and
transmit the second service data flow to a core network gateway using a transmission tunnel between the access network access node and the core network gateway.

16. A method comprising:
sending, by a policy and charging rule function, quality of service (QoS) information to an access network access node;
receiving, by the access network access node, the QoS information from the policy and charging rule function;
allocating, by the access network access node, a resource to an air interface bearer between a user equipment (UE) and the access network access node, wherein the access network access node is wirelessly connected to the UE, and the air interface bearer is a transmission path between the UE and the access network access node;
identifying, by the access network access node, one or more service data flows of the UE;
allocating, by the access network access node, the one or more service data flows of the UE to the air interface bearer according to the QoS information; and
sending, by the access network access node, a mapping relationship between the one or more service data flows of the UE and the air interface bearer to the UE.

17. The method according to claim 16, further comprising:
transmitting, by the access network access node, the one or more service data flows of the UE on the air interface bearer.

18. The method according to claim 16, wherein the mapping relationship is carried in a radio resource control (RRC) connection reconfiguration message.

19. The method according to claim 16, wherein receiving the QoS information from the policy and charging rule function comprises:
receiving, by the access network access node using a mobility management entity, the QoS information from the policy and charging rule function.

20. The method according to claim 16, further comprising:
receiving, by the access network access node, a second service data flow from the UE on the air interface bearer; and
transmitting, by the access network access node, the second service data flow to a core network gateway using a transmission tunnel between the access network access node and the core network gateway.

* * * * *